United States Patent
Garifi et al.

(10) Patent No.: US 12,545,516 B2
(45) Date of Patent: Feb. 10, 2026

(54) COORDINATING AUTOMATED PALLET MOVERS AND CONVEYING SYSTEMS IN AN AUTOMATED WAREHOUSE

(71) Applicant: Lineage Logistics, LLC, Irvine, CA (US)

(72) Inventors: Kaitlyn Garifi, Irvine, CA (US); Daniël Walet, Oakland, CA (US); René van Eekelen, Bergen op Zoom (NL)

(73) Assignee: Lineage Logistics, LLC, Irvine, CA (US)

( * ) Notice: Subject to any disclaimer, the term of this patent is extended or adjusted under 35 U.S.C. 154(b) by 517 days.

(21) Appl. No.: 18/095,851

(22) Filed: Jan. 11, 2023

(65) Prior Publication Data

US 2023/0219761 A1    Jul. 13, 2023

Related U.S. Application Data

(60) Provisional application No. 63/298,610, filed on Jan. 11, 2022, provisional application No. 63/298,584, filed on Jan. 11, 2022.

(51) Int. Cl.
*B65G 1/137* (2006.01)
*B65G 1/04* (2006.01)

(52) U.S. Cl.
CPC ......... *B65G 1/1375* (2013.01); *B65G 1/0492* (2013.01); *B65G 2201/0267* (2013.01)

(58) Field of Classification Search
CPC ............... B65G 1/1375; B65G 1/0492; B65G 2201/0267; B65G 1/1373; B65G 1/0485
See application file for complete search history.

(56) References Cited

U.S. PATENT DOCUMENTS

| | | |
|---|---|---|
| 8,210,791 B2 | 7/2012 | Chilson et al. |
| 9,827,683 B1 | 11/2017 | Hance et al. |
| 10,126,747 B1 | 11/2018 | Svec et al. |
| 10,466,692 B2 | 11/2019 | Douglas et al. |
| 11,117,759 B2 | 9/2021 | Elazary et al. |
| 11,180,069 B2 * | 11/2021 | Jarvis ............. G06Q 10/08 |
| 11,568,508 B2 | 1/2023 | High et al. |

(Continued)

FOREIGN PATENT DOCUMENTS

| | | | |
|---|---|---|---|
| CA | 2712878 A1 * | 2/2011 | ........... B65G 1/0485 |
| CN | 106628791 A | 5/2017 | |

(Continued)

*Primary Examiner* — Justin Holmes
(74) *Attorney, Agent, or Firm* — Barnes & Thornburg LLP

(57) ABSTRACT

In general, the subject matter described in this disclosure can be embodied in a pallet-conveying system. The pallet-conveying system includes a vehicle-traversing loop, multiple vehicles configured to travel around the vehicle-traversing loop and move pallets around the vehicle-traversing loop, an inbound conveying lane arranged to move inbound pallets from a docking area to the vehicle-traversing loop, multiple outbound conveying lanes arranged to transfer pallets from the vehicle-traversing loop to the docking area, an into-storage conveying lane arranged to move pallets from the vehicle-traversing loop to a storage area, a from-storage conveying lane arranged to move pallets from the storage area to the vehicle-traversing loop, and multiple pallet stands located within an interior of the vehicle-traversing loop to receive pallets from the multiple vehicles.

19 Claims, 12 Drawing Sheets

(56) References Cited

U.S. PATENT DOCUMENTS

| | | | |
|---|---|---|---|
| 2007/0065258 A1* | 3/2007 | Benedict | B65G 1/04 |
| | | | 414/266 |
| 2019/0025846 A1 | 1/2019 | Wu | |
| 2020/0319648 A1* | 10/2020 | Eckman | G01C 21/206 |
| 2021/0002074 A1 | 1/2021 | Otto et al. | |
| 2021/0326800 A1 | 10/2021 | Jacobus et al. | |
| 2021/0403255 A1 | 12/2021 | Elazary et al. | |
| 2022/0184664 A1* | 6/2022 | Porat | G05D 1/644 |

FOREIGN PATENT DOCUMENTS

| | | | |
|---|---|---|---|
| CN | 211168939 U | 8/2020 | |
| CN | 112298878 B | 7/2022 | |
| WO | WO-2020258429 A1 * | 12/2020 | B65G 1/0407 |

* cited by examiner

COORDINATING AUTOMATED PALLET MOVERS AND CONVEYING SYSTEMS IN AN AUTOMATED WAREHOUSE

CROSS-REFERENCE TO RELATED APPLICATIONS

This application claims priority to U.S. Provisional Application Ser. No. 63/298,584, filed on Jan. 11, 2022; and U.S. Provisional Application Ser. No. 63/298,610, filed on Jan. 11, 2022. The disclosures of the prior applications are considered part of the disclosure of this application, and are incorporated entirely into this application.

TECHNICAL FIELD

This document generally describes automated warehouse systems, and technology for coordinating the operations of vehicles and conveying systems that are configured to convey pallets in an automated warehouse.

BACKGROUND

In general, automated warehouse systems can automate storage and retrieval of goods and pallets in a warehouse. Pallets, for example, can be flat transport structures that support goods in a stable manner and that are adapted to fit forklifts and/or other warehouse equipment to move the pallets. Automated warehouse systems can include conveyors designed for transporting goods and pallets to specific warehouse locations, and racking systems for storing and retrieving the goods and pallets.

SUMMARY

This document describes techniques, methods, systems, and other mechanisms for coordinating the operations of vehicles and conveying systems that are configured to convey pallets in an automated warehouse. Some embodiments described herein include coordinating the operations of multiple vehicles that are configured to move pallets and travel around a vehicle-traversing loop, in an area between a pallet loading/unloading area and a pallet storage area in the warehouse. The warehouse may include a pallet loading/unloading area where trucks are docked so that pallets can be unloaded from, or loaded to, the trucks. The warehouse may further include a pallet storage area configured to store pallets in a dense arrangement. For example, the pallet storage area may include multiple-story racks with an elevator system operable to convey pallets to/from different floors of the racks.

Typically, a conveyor belt system may be used to transport pallet between the pallet loading/unloading area and the pallet storage area. A conveyor belt system includes a complex layout of conveyor belts which has many connection points between the conveyor belts and many bottleneck areas where multiple conveyor belts are connected to one conveyor belt. The conveyor belt system operates to concurrently convey multiple pallets from different start locations to different end locations. For example, the pallet loading/unloading area may include multiple decks from which pallets can be loaded to trucks, and to which pallets can be unloaded from trucks by workers. Further, the pallet racks may have multiple columns and rows in multiple levels (heights) to/from which pallets can be transported using different elevators. Such a complex conveyor belt system may result in clogging when a large number of pallets are conveyed at the same time between different start locations and end locations.

The pallet transportation system described herein uses rail guided vehicles (RGVs) that replace the complex installed conveyor belt system to move pallets in a warehouse. Rail guided vehicles can traverse one or more loops through the warehouse and can be capable of picking up, moving, and dropping off pallets at various locations in the warehouse. Warehouses and control algorithms can be configured to coordinate and optimize the operation of rail guided vehicles in the warehouse, such that bottlenecks are avoided, and schedules are maintained. For example, the warehouses can include various storage locations (e.g., pallets stands) that are configured to receive a pallet from a rail guided vehicle, temporarily hold the pallet, and then release the pallet to a potentially different rail guided vehicle at a designated time. The control algorithms, for example, can include techniques for determining when to release a pallet for pick-up by a rail guided vehicle, possibly changing the destination location of the pallet (e.g., sending the pallet to a temporary storage location), and possibly prioritizing the pallet.

Particular implementations can, in certain instances, realize one or more of the following advantages. The vehicle-traversing loop-based system described herein can replace conventional pallet transportation devices, such as conveyor belt systems, to provide greater flexibility, to avoid bottlenecks, and to reduce the transport times of items being moved through a warehouse. Further, optimized control algorithms for the vehicles configured to move pallets around the vehicle-traversing loop can improve the routing of pallets between storage area conveying systems and dock area conveying systems—thus ensuring that pallets are received in an optimal order and that schedules are met. A staging time for outbound vehicles can be minimized due to increased scheduling reliability and increased item throughput. For inbound items, an inbound conveying lane can be more efficiently used, such that equipment that unloads a delivery vehicle can continually unload the vehicle without waiting for the conveying lane to become available. The vehicles that move the pallets around the vehicle-traversing loop can be efficiently used, thus saving power used by vehicles and reducing wear and tear on the vehicles.

This document also describes techniques, methods, systems, and other mechanisms for warehouse systems, including a common rework station that serves multiple lanes of an intake conveying system. In general, an intake conveying system can be configured to inspect, rework, and convey inbound items (e.g., pallets, crates, boxes, or other sorts of containers of goods) received from a loading dock. The intake conveying system can include multiple inbound lanes configured to receive items, each inbound lane having a respective inspection station configured to identify and inspect items using various types of sensors. Items that do not meet particular criteria and that are fixable at the intake conveying system can be reworked at the system. Items that do not meet the criteria and that are not fixable at the intake conveying system can be rejected and routed away from the system to a working area. The intake conveying system includes a common rework station configured to serve multiple different inbound conveying lanes. Workers and/or automated equipment at the common rework station can resolve problems of the item, if possible, and the item can be routed back to one of the inbound conveying lanes once rework has been completed. As a warehouse management system is notified of various tasks to be performed in a warehouse environment (e.g., including tasks related to the intake conveying system and other warehouse systems), the tasks can be delegated to suitable workers through various task prioritization and worker selection techniques.

Particular implementations can, in certain instances, realize one or more of the following advantages. Since a minority of pallets, crates, boxes, or other sorts of containers of goods are to be reworked or are rejected in a warehouse environment, having a common rework station that serves multiple inbound lanes (and other areas of a warehouse) can conserve warehouse resources. Tasks related to transporting pallets throughout the warehouse can be assigned such that the tasks are completed by target times, and travel time between tasks is reduced.

As additional description to the embodiments described below, the present disclosure describes the following embodiments.

Embodiment A1 is a pallet-conveying system, comprising: a vehicle-traversing loop; multiple vehicles configured to travel around the vehicle-traversing loop and move pallets around the vehicle-traversing loop; an inbound conveying lane arranged to move inbound pallets from a docking area to the vehicle-traversing loop; multiple outbound conveying lanes arranged to transfer pallets from the vehicle-traversing loop to the docking area; an into-storage conveying lane arranged to move pallets from the vehicle-traversing loop to a storage area; a from-storage conveying lane arranged to move pallets from the storage area to the vehicle-traversing loop; and multiple pallet stands located within an interior of the vehicle-traversing loop to receive pallets from the multiple vehicles.

Embodiment A2 is the pallet-conveying system of embodiment A1, wherein each pallet stand of the multiple pallet stands is configured to accept a single pallet at a time, and wherein each pallet stand of the multiple pallet stands is configured to receive a pallet from the vehicle-traversing loop by moving the pallet in a first direction, and return the pallet to the vehicle-traversing loop in a second direction that is opposite the first direction.

Embodiment A3 is the pallet-conveying system of any one of embodiments A1-A2, further comprising a common rework station that is adapted to receive pallets that do not satisfy criteria for proceeding from the inbound conveying lane to the vehicle-traversing loop, the common rework station being structured to provide human access to and manipulation of pallets received at the common rework station.

Embodiment A4 is the pallet-conveying system of any one of embodiments A1-A3, further comprising a pallet elevator located within the interior of the vehicle-traversing loop to receive pallets from the multiple vehicles on a first level of a building that includes the pallet-conveying system and provide received pallets to a second level of the building, and to receive pallets from the second level of the building and provide received pallets to the first level of the building.

Embodiment A5 is the pallet-conveying system of embodiment A4, further comprising an inbound-elevator conveying lane to transfer pallets from the vehicle-traversing loop to the pallet elevator; and an outbound-elevator conveying lane to transfer pallets from the pallet elevator to the vehicle-traversing loop.

Embodiment A6 is the pallet-conveying system of any one of embodiments A1-A5, wherein the vehicle-traversing loop includes a physical rail, and each vehicle of the multiple vehicles is a rail-guided vehicle.

Embodiment A7 is the pallet-conveying system of any one of embodiments A1-A6, wherein the vehicle-traversing loop includes multiple sub-loops, such that the multiple vehicles are able to traverse from a first side of the loop to a second side of the loop via each of multiple different paths.

Embodiment B1 is a computer-implemented method, comprising: determining, by a computing system, that a first pallet has been conveyed by a first conveying system to a pick-up location at a vehicle-traversing loop, around which multiple vehicles are configured to travel and move pallets, the first pallet having a destination of a second conveying system that is arranged to move pallets away from the vehicle-traversing loop; identifying, by the computing system, that the second conveying system is designated to receive a second pallet from the vehicle-traversing loop before the first pallet; determining, by the computing system, whether the second pallet has been received by the second conveying system; responsive to determining that the second pallet has not been received by the second conveying system, determining, by the computing system, whether the first pallet is blocking the second pallet from being conveyed by the first conveying system to the vehicle-traversing loop; and responsive to determining that the first pallet is blocking the second pallet from being conveyed by the first conveying system to the vehicle-traversing loop: releasing, by the computing system, the first pallet from the pick-up location to the vehicle-traversing loop; and designating, by the computing system, the destination of the first pallet as a storage location that is different from the second conveying system and that is served by the vehicle-traversing loop.

Embodiment B2 is the computer-implemented method of embodiment B1, wherein the second conveying system comprises an outbound conveying lane arranged to move pallets from the vehicle-traversing loop to a docking area.

Embodiment B3 is the computer-implemented method of embodiment B1, wherein the second conveying system comprises a combined pick-up and drop-off location arranged to move pallets from the vehicle-traversing loop to a spur-out providing station.

Embodiment B4 is the computer-implemented method of any one of embodiments B1-B3, wherein the vehicle-traversing loop comprises a rail; and the multiple vehicles comprise rail-guided vehicles.

Embodiment B5 is the computer-implemented method of any one of embodiments B1-B4, wherein the storage location comprises a pallet stand configured to receive and store a single pallet at a time from the vehicle-traversing loop.

Embodiment B6 is the computer-implemented method of embodiment B5, wherein the pallet stand is located within an interior of the vehicle-traversing loop.

Embodiment B7 is the computer-implemented method of embodiment B6, wherein multiple pallet stands are located within the interior of the vehicle-traversing loop; and the method comprises selecting, by the computing system, the pallet stand from among the multiple pallet stands to designate as the storage location for the first pallet, as a result of the pallet stand being a nearest-available pallet stand, of the multiple pallet stands, that is located upstream of the second conveying system.

Embodiment B8 is the computer-implemented method of any one of embodiments B1-B7, further comprising determining, by the computing system, that the second pallet has been moved by the vehicle-traversing loop to the second conveying system; and releasing, by the computing system, the first pallet to the vehicle-traversing loop, responsive to determining that the second pallet has been moved to the second conveying system.

Embodiment B9 is the computer-implemented method of any one of embodiments B1-B8, wherein the computing system is configured to release the first pallet from the pick-up location to the vehicle-traversing loop with the destination being the second conveying system, had the computing system determined that the second pallet had been received by the second conveying system.

Embodiment B10 is the computer-implemented method of any one of embodiments B1-B9, wherein the computing system is configured to hold the first pallet at the pick-up location, had the computing system determined that the first pallet was not blocking the second pallet from being conveyed by the first conveying system to the vehicle-traversing loop.

Embodiment B11 is the computer-implemented method of embodiment B10, wherein the computing system is configured to designate the second pallet has having priority status while the first pallet is being held at the pick-up location, had the computing system determined that the first pallet was not blocking the second pallet from being conveyed by the first conveying system to the vehicle-traversing loop.

Embodiment C1 is a computer-implemented method, comprising: determining, by a computing system, that a first pallet has been conveyed by a first conveying system to a pick-up location at a vehicle-traversing loop, around which multiple vehicles are configured to travel and move pallets, the first pallet having a destination of an elevator that is accessible via the vehicle-traversing loop; determining, by the computing system, whether the elevator is available to receive the first pallet; and responsive to determining that the elevator is not available to receive the first pallet: releasing, by the computing system, the first pallet from the pick-up location to the vehicle-traversing loop; and designating, by the computing system, the destination of the first pallet as a storage location that does not provide access to the elevator without use of the vehicle-traversing loop.

Embodiment C2 is the computer-implemented method of embodiment C1, wherein the vehicle-traversing loop comprises a rail; and the multiple vehicles comprise rail-guided vehicles.

Embodiment C3 is the computer-implemented method of any one of embodiments C1-C2, wherein the storage location comprises a pallet stand configured to receive and store a single pallet at a time from the vehicle-traversing loop.

Embodiment C4 is the computer-implemented method of embodiment C3, wherein the pallet stand is located within an interior of the vehicle-traversing loop.

Embodiment C5 is the computer-implemented method of embodiment C4, wherein multiple pallet stands are located within the interior of the vehicle-traversing loop; and the method comprises selecting, by the computing system, the pallet stand from among the multiple pallet stands to designate as the storage location for the first pallet as a result of the pallet stand being a nearest-available pallet stand, of the multiple pallet stands, that is located upstream of the elevator.

Embodiment C6 is the computer-implemented method of any one of embodiments C1-05, wherein the computing system is configured to release the first pallet from the pick-up location to the vehicle-traversing loop with the destination of the first pallet being the elevator, had the computing system determined that the elevator was available to receive the first pallet.

Embodiment C7 is the computer-implemented method of any one of embodiments C1-C6, wherein determining whether the elevator is available to receive the first pallet includes determining whether a threshold number of pallets are located on a second conveying system that is arranged to move pallets from the vehicle-traversing loop to the elevator.

Embodiment C8 is the computer-implemented method of embodiment C7, wherein determining whether the elevator is available to receive the first pallet includes accounting for a number of pallets that are not yet located on the second conveying system but that are being moved to the second conveying system along the vehicle-traversing loop.

Embodiment C9 is the computer-implemented method of any one of embodiments C1-C8, wherein the elevator is located within an interior of the vehicle-traversing loop.

Embodiment C10 is the computer-implemented method of embodiment C9, wherein an elevator-serving conveying system is arranged to move pallets from the vehicle-traversing loop to the elevator.

Embodiment D1 is a computer-implemented method, comprising: identifying, by a computing system, that a vehicle is moving around a vehicle-traversing loop with a first pallet that has a destination of a combined pick-up and drop-off location of a conveying system that extends away from the vehicle-traversing loop; determining, by the computing system, that a second pallet is located at the combined pick-up and drop-off location; responsive to determining that the second pallet is located at the combined pick-up and drop-off location: designating, by the computing system, the destination for the first pallet as a storage location that is different from the combined pick-up and drop-off location; and releasing, by the computing system, the second pallet to the vehicle-traversing loop.

Embodiment D2 is the computer-implemented method of embodiment D1, wherein the vehicle-traversing loop comprises a rail; and the vehicle is a rail-guided vehicle.

Embodiment D3 is the computer-implemented method of any one of embodiments D1-D2, wherein the storage location comprises a pallet stand configured to receive and store a single pallet at a time from the vehicle-traversing loop.

Embodiment D4 is the computer-implemented method of embodiment D3, wherein the pallet stand is located within an interior of the vehicle-traversing loop.

Embodiment D5 is the computer-implemented method of embodiment D4, wherein the pallet stand is located across a portion of the vehicle-traversing loop from the combined pick-up and drop-off location, such that the vehicle is adapted to move the first pallet to the pallet stand and receive the second pallet from the combined pick-up and drop-off location without the vehicle moving along the vehicle-traversing loop.

Embodiment D6 is the computer-implemented method of any one of embodiments D4-D5, wherein multiple pallet stands are located within the interior of the vehicle-traversing loop; and the method comprises selecting, by the computing system, the pallet stand from among the multiple pallet stands to designate as the storage location for the first pallet as a result of the pallet stand being a nearest-available pallet stand, of the multiple pallet stands, that is located upstream of the combined pick-up and drop-off location.

Embodiment D7 is the computer-implemented method of any one of embodiments D1-D6, wherein designating the destination for the first pallet as the storage location and releasing the second pallet to the vehicle-traversing loop results in the vehicle moving the first pallet to the storage location and then receiving the second pallet from the combined pick-up and drop-off location before the vehicle receives any other pallet.

Embodiment D8 is the computer-implemented method of embodiment D7, further comprising: determining, by the computing system, that the vehicle has received the second pallet from the combined pick-up and drop-off location; and responsive to determining that the vehicle has received the second pallet from the combined pick-up and drop-off location: releasing, by the computing system, the first pallet from the storage location to the vehicle-traversing loop to be picked up by the vehicle or another vehicle on the vehicle-traversing loop; and designating, by the computing system, the destination of the first pallet as the combined pick-up and drop-off location.

Embodiment D9 is the computer-implemented method of any one of embodiments D1-D8, wherein the conveying system that extends away from the vehicle-traversing loop includes: (i) an inbound conveying lane arranged to direct pallets to the combined pick-up and drop-off location, and (ii) an outbound conveying lane arranged to direct pallets away from the combined pick-up and drop-off location.

Embodiment E1 is an intake conveying system for a storage facility, comprising a first inbound conveying lane that is adapted to convey pallets from a first receiving station of the first inbound conveying lane to a first providing station of the first inbound conveying lane, the first receiving station being adapted to receive pallets from pallet-moving vehicles, the first providing station being adapted to provide pallets to a second conveying system; a second inbound conveying lane that is adapted to convey pallets from a second receiving station of the second inbound conveying lane to a second providing station of the second inbound conveying lane, the second receiving station being adapted to receive pallets from pallet-moving vehicles, the second providing station being adapted to provide pallets to the second conveying system; a first rework conveying lane that is adapted to receive pallets from the first inbound conveying lane that do not satisfy criteria for proceeding past the intake conveying system; a second rework conveying lane that is adapted to receive pallets from the second inbound conveying lane that do not satisfy the criteria for proceeding past the intake conveying system; a common rework station that is adapted to receive pallets that do not satisfy the criteria for proceeding past the intake conveying system from both the first rework conveying lane and the second rework conveying lane, the common rework station being structured to provide human access to and manipulation of pallets received at the common rework station; and a first return lane that is adapted to receive pallets from the common rework station and provide such pallets to the first inbound conveying lane.

Embodiment E2 is the intake conveying system of embodiment E1, wherein the common rework station includes an elevated floor to place human feet at a base of a pallet located at the common rework station, wherein the common rework station provides human walking access entirely around four sides of the pallet located at the common rework station.

Embodiment E3 is the intake conveying system of embodiment E2, wherein the common rework station is adapted to receive only a single pallet at a time.

Embodiment E4 is the intake conveying system of any one of embodiments E1-E3, comprising a rework-receiving routing station adapted to selectively receive pallets from either of the first rework conveying lane and the second rework conveying lane, and to provide such received pallets along a common path to the common rework station.

Embodiment E5 is the intake conveying system of any one of embodiments E1-E4, comprising a second return lane that is adapted to receive pallets from the common rework station and provide such pallets to the second inbound conveying lane.

Embodiment E6 is the intake conveying system of embodiment E5, comprising a rework-return routing station adapted to receive pallets from the common rework station and selectively provide such pallets to either of the first return lane and the second return lane.

Embodiment E7 is the intake conveying system of embodiment E6, wherein the rework-return routing station is adapted to selectively provide pallets received from the common rework station to a reject station, in addition to the first return lane and the second return lane, the reject station being adapted to provide pallets to a pallet-moving vehicle.

Embodiment E8 is the intake conveying system of any one of embodiments E1-E7, wherein the first inbound conveying lane includes a first photographing location at which pallets being conveyed by the first inbound conveying lane are photographed by a first image sensor; the second inbound conveying lane includes a second photographing location at which pallets being conveyed by the second inbound conveying lane are photographed by a second image sensor; and the criteria for a pallet proceeding past the intake conveying system includes a label provided by the respective pallet being captured by the first image sensor or the second image sensor.

Embodiment E9 is the intake conveying system of embodiment E8, wherein the criteria for the pallet proceeding past the intake conveying system includes the respective pallet satisfying a structural profile to ensure that the respective pallet can be property handled by other conveying systems.

Embodiment E10 is the intake conveying system of embodiment E9, wherein the first photographing location is positioned between the first receiving station and the first providing station as part of the first inbound conveying lane; and the second photographing location is positioned between the second receiving station and the second providing station as part of the second inbound conveying lane.

Embodiment E11 is the intake conveying system of embodiment E10, wherein the first inbound conveying lane includes a first routing station to selectively provide pallets to either of the first providing station and the first rework conveying lane, based on whether such pallets satisfy the criteria for proceeding past the intake conveying system; and the second inbound conveying lane includes a second routing station to selectively provide pallets to either of the second providing station and the second rework conveying lane, based on whether such pallets satisfy the criteria for proceeding past the intake conveying system.

Embodiment E12 is the intake conveying system of embodiment E11, wherein the first routing station is positioned between the first photographing location and the first providing station as part of the first inbound conveying lane; and the second routing station is positioned between the second photographing location and the second providing station as part of the second inbound conveying lane.

Embodiment E13 is the intake conveying system of any one of embodiments E11-E12, comprising a spur-out lane that extends from the first routing station to a spur-out providing station, the spur-out providing station being adapted to provide pallets to pallet-moving vehicles; and a spur-in lane that extends from a spur-in receiving station to the first inbound conveying lane, the spur-in receiving station being adapted to receive pallets from pallet-moving vehicles, wherein the first routing station is adapted to selectively provide pallets to the spur-out lane, in addition to the first providing station and the first rework conveying lane.

Embodiment E14 is the intake conveying system of any one of embodiments E1-E13, wherein the first inbound conveying lane is adapted to simultaneously accommodate no more than ten pallets at a time; and the second inbound conveying lane is adapted to simultaneously accommodate no more than ten pallets at a time.

Embodiment E15 is the intake conveying system of any one of embodiments E1-E14, wherein the second conveying system is adapted to convey pallets in a loop, to move pallets from the intake conveying system to a storage portion of the storage facility, and to move pallets from the storage portion of the storage facility to an outbound conveying system of the storage facility.

Embodiment E16 is the intake conveying system of embodiment E15, wherein the loop of the second conveying system comprises a rail loop; and the second conveying system includes multiple rail-guided vehicles adapted to move pallets along the rail loop.

Embodiment E17 is the intake conveying system of any one of embodiments E1-E16, wherein the pallet-moving vehicles include human-operated lift trucks.

Embodiment E18 is the intake conveying system of any one of embodiments E1-E17, comprising a computing system configured to assign human workers to selectively perform tasks at: (i) the common rework station, based on an amount of pallets queued at the common rework station, and an amount of time that pallets have been waiting at the common rework station, and (ii) the reject station, based on an amount of time that a pallet has been waiting at the reject station.

Embodiment E19 is an intake conveying system for a storage facility, comprising a first inbound conveying lane that is adapted to convey pallets from a first receiving station of the first inbound conveying lane to a first providing station of the first inbound conveying lane, the first receiving station being adapted to receive pallets from pallet-moving vehicles, the first providing station being adapted to provide pallets to a second conveying system; a second inbound conveying lane that is adapted to convey pallets from a second receiving station of the second inbound conveying lane to a second providing station of the second inbound conveying lane, the second receiving station being adapted to receive pallets from pallet-moving vehicles, the second providing station being adapted to provide pallets to the second conveying system; a first rework conveying lane that is adapted to receive pallets from the first inbound conveying lane that do not satisfy criteria for proceeding past the intake conveying system; a second rework conveying lane that is adapted to receive pallets from the second inbound conveying lane that do not satisfy the criteria for proceeding past the intake conveying system; a rework-receiving routing station adapted to selectively receive pallets from either of the first rework conveying lane and the second rework conveying lane, and to provide such received pallets along a common path to a common rework station, the common rework station being adapted to receive pallets that do not satisfy the criteria for proceeding past the intake conveying system from both the first rework conveying lane and the second rework conveying lane, the common rework station being structured to provide human access to and manipulation of pallets received at the common rework station; and a rework-return routing station adapted to receive pallets from the common rework station and selectively provide such pallets to either of a first return lane and a second return lane, the first return lane being adapted to receive pallets from the common rework station and provide such pallets to the first inbound conveying lane, and the second return lane that being adapted to receive pallets from the common rework station and provide such pallets to the second inbound conveying lane.

Embodiment E20 is the intake conveying system of embodiment E19, wherein the second conveying system is adapted to convey pallets in a vehicle-traversing loop, wherein multiple vehicles are configured to travel around the vehicle-traversing loop to move pallets from the intake conveying system to a storage portion of the storage facility, and to move pallets from the storage portion of the storage facility to an outbound conveying system of the storage facility.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
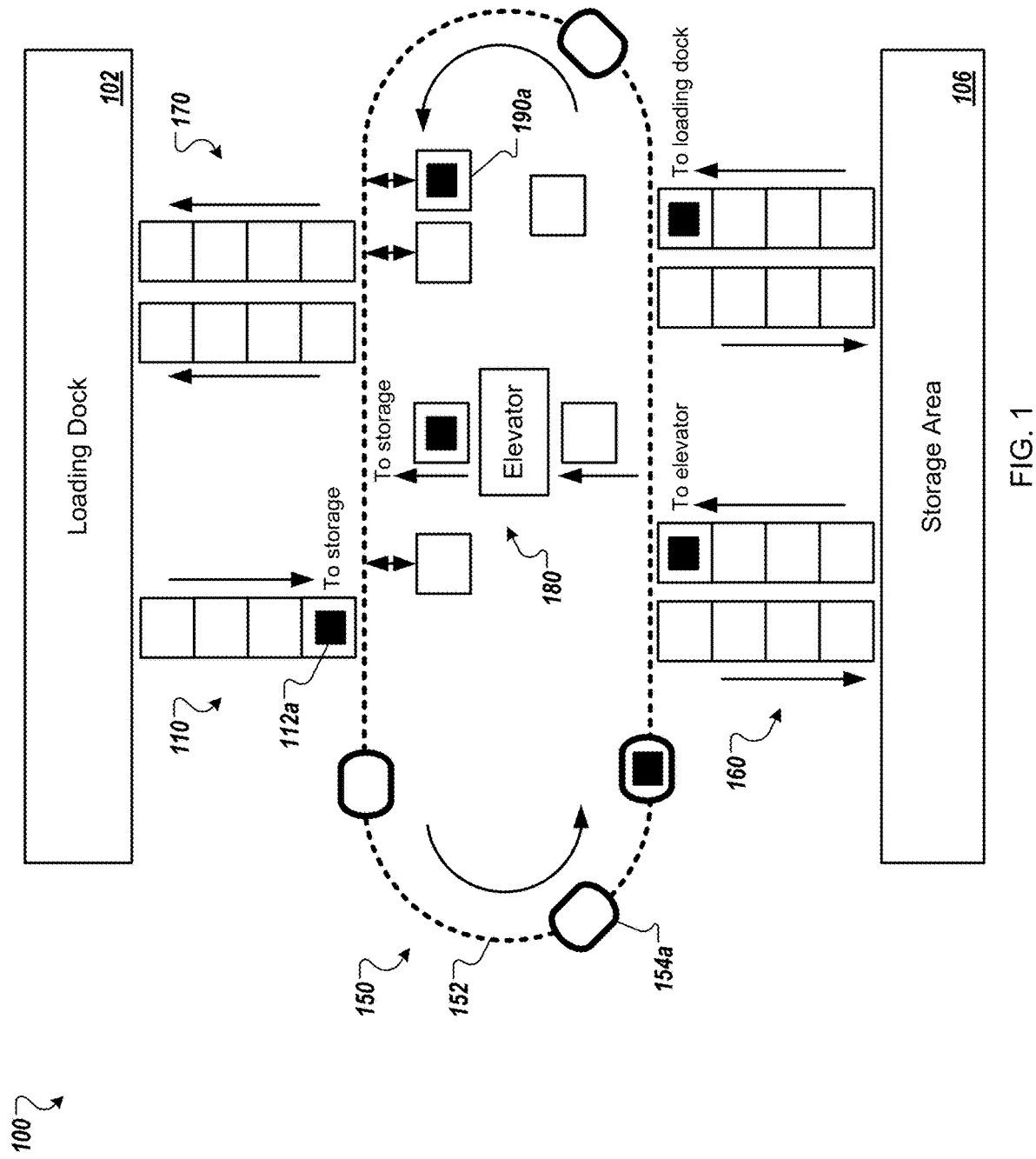
FIG. 1 conceptually illustrates a warehouse environment that includes multiple conveying systems that are configured to convey items in the warehouse environment, and a transport system that is configured to convey items between the conveying systems.

This document generally describes coordinating the operations of vehicles that are configured to convey pallets in an automated warehouse or another sort of storage facility. FIG. 1 conceptually illustrates an example warehouse environment 100 that includes multiple conveying systems that are configured to convey items in the warehouse environment, and a transport system 150 that is configured to convey items between the conveying systems. For example, items (e.g., pallets, crates, boxes, or other sorts of containers of goods) can be received from a delivery vehicle (e.g., a truck) at a loading dock 102, for storage in the warehouse environment 100 at a storage area 106. The items (e.g., item 112a) can be conveyed by an intake conveying system 110 to the transport system 150. The transport system 150, for example, can include multiple vehicles (e.g., vehicle 154a) that are configured to traverse a loop 152 (e.g., along a physical track, along wires on the floor, along marked lines, or using another sort of navigation mechanism), picking up and dropping off items on the way. To store an item, for example, one of the vehicles can pick up the item from the intake conveying system 110, transport the item along the loop 152, and drop off the item to a storage conveying system 160, which can then convey the item to the storage area 106. When the item is to be shipped from the warehouse environment 100, for example, the item can be retrieved from the storage area 106 and conveyed by the storage conveying system 160 to the transport system 150, where it is picked up by one of the vehicles, transported along the loop 152, and dropped off to an outbound conveying system 170, which can then convey the item to the loading dock 102.

Occasionally, an item is to be sent to another level of the warehouse environment 100. For example, a warehouse can include a second level at which various item operations can be performed (e.g., unloading a pallet of goods, distributing the goods to other pallets, and repacking the pallets). To send the item to another level of the warehouse environment 100, for example, the item can be retrieved from the storage area 106 and conveyed by the storage conveying system 160 to the transport system 150, where it is picked up by one of the vehicles, transported along the loop 152, and dropped off to an elevator conveying system 180, which can then convey the item to the other level. When an item is to be returned to storage from the other level of the warehouse environment 100, for example, the item (e.g., a repacked pallet of goods) can be sent by the elevator to the transport system 150, where it is picked up by one of the vehicles, transported along the loop 152, and dropped off to the storage conveying system 160, which can then convey the item to the storage area 106.

Multiple temporary storage locations (e.g., a pallet stand, or another sort of mechanism) can be arranged along an interior of the loop 152. The temporary storage locations (e.g., location 190a), for example, can be used to relieve system bottlenecks, and to ensure that items for shipment away from the warehouse arrive at the loading dock 102 according to a correct loading sequence. If a pallet arrives from the storage conveying system 160 at the transport system 150 out of sequence, and/or is blocking other items from reaching the transport system 150, and/or its final destination is congested, for example, a vehicle can pick up the item, transport the item along the loop 152, and drop off the item at one of the temporary storage locations. When the system bottleneck has cleared, for example, one of the vehicles can pick up the item at the temporary storage location, transport the item along the loop 152, and drop off the item at its final destination.

Figure 2A:
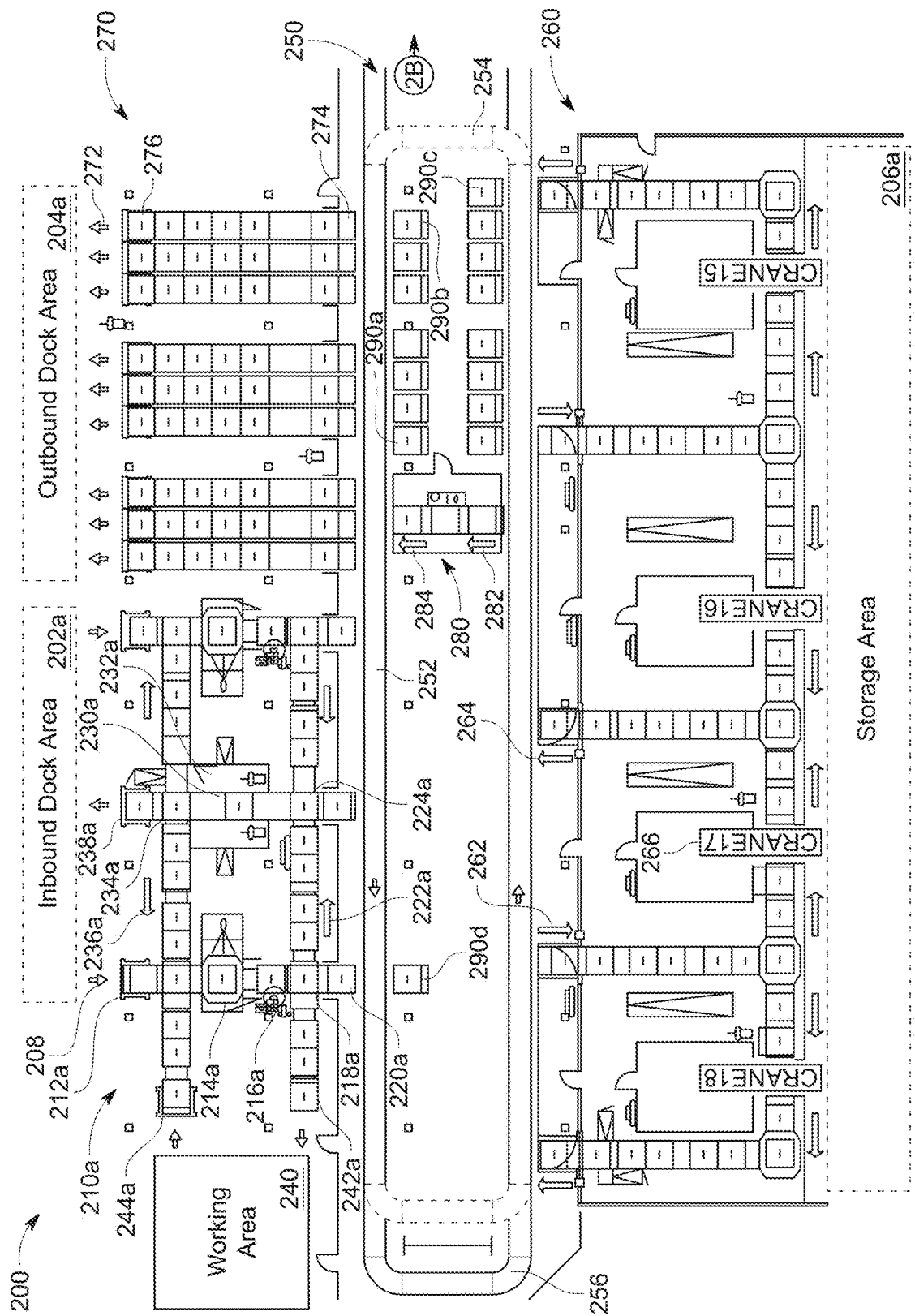
FIGS. 2A-2B depict an example warehouse environment in which inbound items are transported for storage in a storage area, and outbound items are transported to a docking area for delivery away from the warehouse.
Figure 2B:
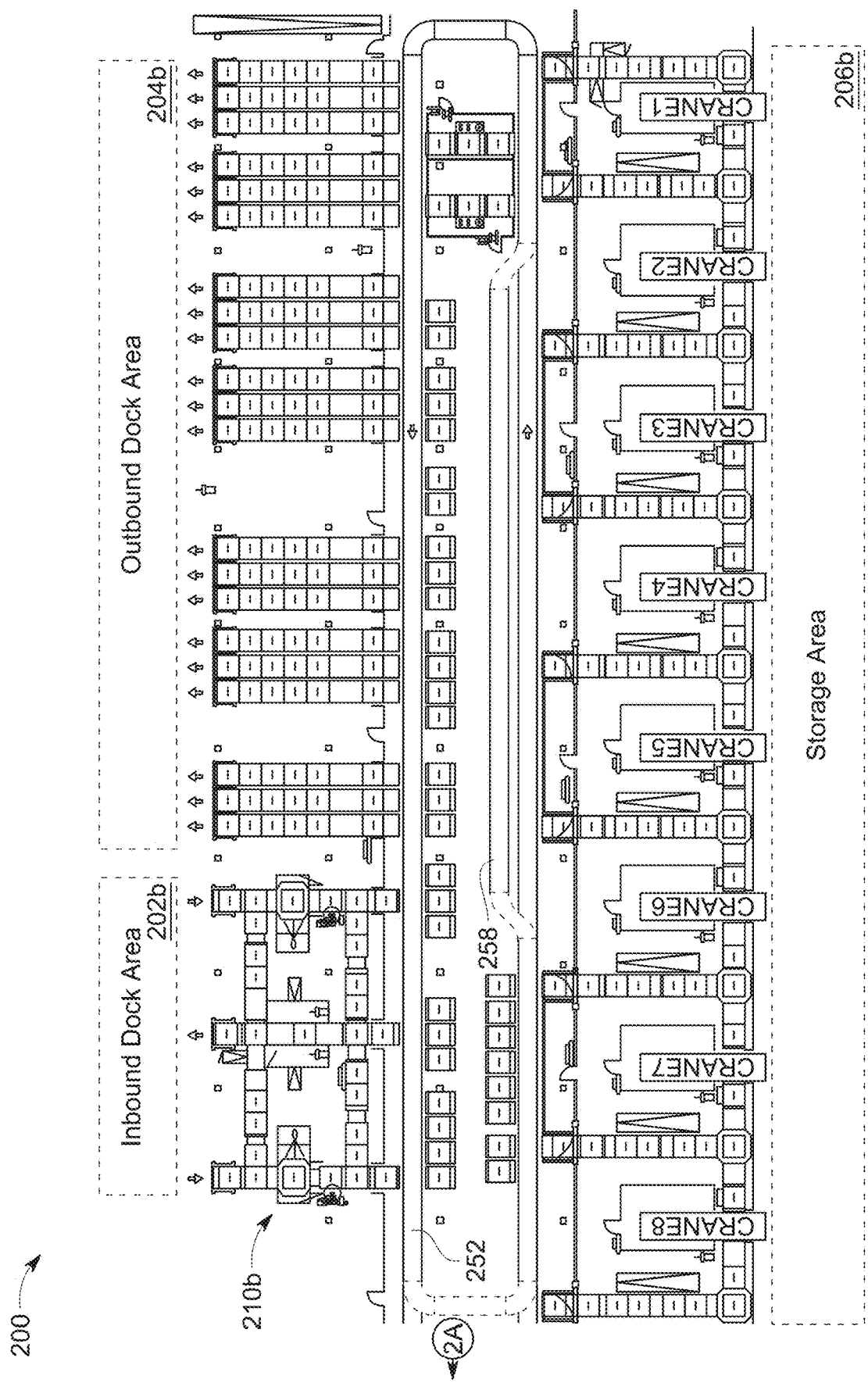

Referring now to FIGS. 2A-2B, an example warehouse environment 200 is depicted, in which inbound items are transported for storage in a storage area, and in which outbound items are transported to a docking area for delivery away from the warehouse. For example, inbound items (e.g., pallets, crates, boxes of goods, etc.) can arrive at an inbound dock area (e.g., inbound dock area 202a, shown in FIG. 2A) of the warehouse environment 200 (e.g., a storage facility), having been transported to the inbound dock area by a delivery vehicle (e.g., a truck, a cargo trailer, etc.). The inbound dock area 202a, for example, can include doors/transport bays that serve as interfaces between inbound delivery vehicles and the warehouse, and through which the inbound items are unloaded from the delivery vehicles. Similarly, an outbound dock area (e.g., outbound dock area 204a, also shown in FIG. 2A), for example, can include doors/transport bays that serve as interfaces between outbound delivery vehicles and the warehouse, and through which the outbound items are loaded into the delivery vehicles, for delivery away from the warehouse. Loading/unloading of delivery vehicles can be performed by warehouse workers (e.g., using forklifts, pallet jacks, or other suitable equipment) and/or may be performed by automated guided vehicles (AGVs). Inbound dock areas and outbound dock areas can be open portions of the warehouse environment 200 that permit maneuvering by the loading/unloading equipment, between the doors/transport bays and other conveying systems of the warehouse. In the present example, the warehouse environment 200 includes multiple inbound dock areas (e.g., inbound dock area 202a shown in FIG. 2A, and inbound dock area 202b shown in FIG. 2B) and multiple outbound dock areas (e.g., outbound dock area 204a shown in FIG. 2A, and outbound dock area 204b shown in FIG. 2B). Other warehouse environments may include more dock areas, fewer dock areas, or a single dock area.

Items can be stored in the warehouse environment 200 in an automated storage area (e.g., storage area 206a). The storage area 206a, for example, can include storage racks that provide item storage locations at various rows/levels. For example, an automated storage and retrieval system (AS/RS) can be configured to service the storage area 206a, including receiving an item for storage, placing the item in an appropriate storage location, maintaining an item inventory that tracks the item in the warehouse environment, and retrieving the item from its storage location at an appropriate time. The AS/RS, for example, can include various types of item handling equipment (e.g., conveyors, cranes, robotic vehicles, etc.) for storing, moving, and retrieving items. In the present example, the warehouse environment 200 includes multiple storage areas (e.g., storage area 206a shown in FIG. 2A, and storage area 206 shown in FIG. 2B). Each storage area, for example, may be separated (e.g., by walls, curtains, or other suitable space dividers), such that environmental conditions (e.g., temperature, humidity, light, etc.) of each storage area can be maintained differently. Other warehouse environments may include more storage areas, fewer storage areas, or a single storage area.

In general, conveying systems of the warehouse environment 200 can include one or more intake conveying systems configured to receive an item from loading/unloading equipment operating in an inbound dock area, and to convey the item to a pick-up location at a vehicle-traversing loop, around which multiple vehicles are configured to travel and move items. A vehicle of the vehicle-traversing loop can pick up the item and move it to a drop-off location of an automated storage conveying system. The storage conveying system can convey the item to item handling equipment that can move the item to a designated storage location (e.g., an appropriate row/level of a storage rack) in a storage area. Later, when the item is to be transported away from the warehouse environment or otherwise processed, the item handling equipment can retrieve the item from its storage location in the storage area, and can provide the item to the storage conveying system. The storage conveying system can then convey the item to a pick-up location at the vehicle-traversing loop, where it can be picked up by a vehicle and moved to a drop-off location of an outbound conveying system. The outbound conveying system can convey the item to an outbound dock area, where the item can be provided to loading/unloading equipment operating in the area. The loading/unloading equipment can then load the item into a delivery vehicle for delivery away from the warehouse.

In the present example, an intake conveying system 210a can receive an item (e.g., a pallet) from loading/unloading equipment (e.g., a forklift, or another suitable manual or automated pallet-moving vehicle) operating in the inbound dock area 202a. For example, the forklift can unload, from a delivery vehicle (e.g., a truck), a pallet of products, and can provide the pallet of products to a receiving station 212a of the intake conveying system 210a. From the receiving station 212a, the pallet is conveyed (e.g., on a conveyor belt, on conveyor rollers, or another suitable conveyor mechanism) along an inbound conveying lane (e.g., a first inbound conveying lane as indicated by arrow 208) of the intake conveying system 210a, to a photographing location 214a of the intake conveying system 210a, at which pallets being conveyed by the inbound conveying lane are photographed by one or more image sensors (e.g., cameras, LIDAR, thermal sensors, barcode scanners, or other suitable image sensors). The photographing location 214a, for example, can be a station that includes a turntable on which the pallet is placed by the conveyor mechanism, and on which the pallet rests while being photographed. The turntable can be configured to rotate the pallet around a z-axis, in a clockwise and/or counterclockwise direction, such that images of the pallet are captured from various sides/angles. The one or image sensors of the photographing location 214a, for example, can be configured to continually capture images of the pallet as it is rotated on the turntable. Images captured by the image sensors can be combined to generate a comprehensive image of the pallet for profiling and characteristic identification. The comprehensive image, for example, can be analyzed to identify a barcode label or other unique identifier of the pallet and/or goods being conveyed on the pallet, and can possibly be analyzed to determine the size and alignment of the pallet and its contents. The unique identifier can be used by inventory tracking systems of the warehouse environment, for example, to track the pallet and its contents throughout the warehouse.

After passing through the photographing location 214a, for example, the pallet can proceed to a laser scanning location 216a. The laser scanning location 216a can be a station that includes a stationary or mobile array of lasers that are configured to capture a profile of the pallet and its contents as the pallet moves past the station. The captured profile, for example, can be analyzed to determine the size and alignment of the pallet and its contents. In some examples, the photographing location 214a and/or the laser scanning location 216a can be equipped with one or more other sensors, such as weight sensors, temperature sensors, motion sensors, and/or other suitable sensors for capturing pallet characteristics.

After passing by the photographing location 214a and the laser scanning location 216a, for example, the pallet can proceed along the inbound conveying lane to a routing station 218a. The routing station 218a can selectively provide pallets to either a providing station 220a of the inbound conveying lane, or to a rework conveying lane 222a, based on whether the pallets satisfy criteria for moving past the intake conveying system 210a. Computers of the intake conveying system 210a, for example, can determine whether a pallet satisfies criteria for proceeding past the intake conveying system, based on sensor data collected at the photographing location 214a and the laser scanning location 216a. If the pallet is successfully identified (e.g., one or more identifiers of the pallet and/or its contents are detected through analysis of the images captured by the image sensors at the photographing location 214a) and if the pallet meets one or more predetermined physical specifications (e.g., size, alignment, integrity, weight, and other suitable constraints, according to sensor data collected at the locations 214a, 216a), the pallet can be routed by the routing station 218a to the providing station 220a of the inbound conveying lane, where the pallet can eventually be released to a different conveying system (e.g., pallet transport system 250). Optionally, a label can be automatically applied to a pallet that satisfies the intake criteria. If the pallet is not successfully identified and/or if the pallet does not meet one or more predetermined physical specifications, however, the pallet can be routed by the routing station 218a to the rework conveying lane 222a that is adapted to receive pallets from the inbound conveying lane that do not satisfy criteria for proceeding past the intake conveying system 210a.

As shown in FIG. 2A, in addition to the first inbound conveying lane (e.g., as indicated by arrow 208), the intake conveying system 210a can also include a second inbound conveying lane (e.g., as indicated by a second down arrow at the right side of the intake conveying system 210a) that is adapted to convey pallets from a second receiving station, past a second photographing location and a second laser scanning location, to a second routing station, and then to a second providing station or a second rework conveying lane. Operations and equipment of the second inbound conveying lane are similar to those described above with respect to the first inbound conveying lane. Although in the present example, each inbound conveying lane is shown as being configured to simultaneously accommodate six pallets, in other examples inbound conveying lanes may be extended (e.g., before or after the photographing locations), such that the lanes may simultaneously accommodate up to ten pallets at a time.

In the present example, pallets can be routed by either of the rework conveying lanes (e.g., the first rework conveying lane 222a, or the second rework conveying lane from the second inbound conveying lane) to a rework-receiving routing station 224a that is adapted to selectively receive pallets from either of the first rework conveying lane and the second rework conveying lane, and to provide such received pallets along a common path to a common rework station 230a. The common rework station 230a can be structured to provide workers with access to pallets received at the station, such that the pallets can be manually and/or automatically manipulated at the station. For example, the common rework station 230a can include an elevated floor 232a so that a worker's feet can be placed at a base of a pallet located at the station, and the worker can walk entirely around four sides of the pallet. Ramps or stairs can be provided up to the elevated floor 232a to provide workers access to the pallet, for example. The common rework station 230a shown in the present example is adapted to receive a single pallet at a time, however other rework stations may receive multiple pallets. A warehouse worker can be provided with information (e.g., on a personal computing device and/or a fixed output device at the common rework station) that describes which criteria the pallet had not satisfied (e.g., a label is missing or unreadable, contents of the pallet are misaligned, the pallet is an improper size or type, the pallet is broken, etc.). If the warehouse worker determines that operations can be performed at the common rework station 230*a* to rectify the identified problems, for example, the warehouse worker can perform the operations (e.g., printing and applying a new label, adjusting the pallet, re-wrapping contents of the pallet, etc.), manually, or by using automated equipment. After the operations have been performed, the worker can indicate that the pallet is ready to return to the inbound conveying lane (e.g., by pressing a button mounted on a pedestal). If the warehouse worker determines that operations cannot be performed at the common rework station 230*a* to rectify the identified problems, however, the pallet can be rejected by the worker. As another example, the intake conveying system 210*a* can automatically reject a pallet as a result of a particular criterion not being met (e.g., an improper or broken pallet), and/or as a result of a threshold number of prior determinations (e.g., 2, 3, or another suitable number) having occurred of the pallet not satisfying the intake criteria.

After being at the rework station 230*a*, the pallet can proceed to a rework-return routing station 234*a* that is adapted to receive pallets from the common rework station 230*a*. In some implementations, an intake conveying system may include a single return lane, and may route all reworked pallets to one of the inbound conveying lanes. The rework-return routing station 234*a*, for example, can be configured to provide reworked pallets to a return lane 236*a* that routes the reworked pallets back to the first inbound conveying lane (e.g., indicated by the left down arrow). In some implementations, an intake conveying system may include first and second return lanes, each return lane being adapted to receive pallets from a common rework station and provide such pallets to a respective inbound conveying lane. For example, the rework-return routing station 234*a* of the intake conveying system 210*a* can selectively provide a received pallet to either the return lane 236*a* that routes the pallet to the first inbound conveying lane, or a second return lane that routes the pallet to the second inbound conveying lane (e.g., indicated by the right down arrow). A decision for the intake conveying system 210*a* to select either a first or second return lane, for example, can be based on capacity of the corresponding inbound conveying lanes (e.g., with the pallet being routed to an inbound conveying lane having greater capacity), an original inbound conveying lane used to receive the pallet (e.g., with the pallet being returned to its original inbound conveying lane), or other suitable decision-making criteria. After arriving at an appropriate inbound conveying lane, for example, a reworked pallet can again proceed to the inbound conveying lane's photographing location and laser scanning location, and a determination can again be performed of whether the reworked pallet satisfies the intake criteria.

In the present example, the rework-return routing station 234*a* can also be adapted to selectively provide pallets received from the rework station 230*a* to a reject station 238*a*, the reject station being adapted to provide pallets to a pallet-moving vehicle. For example, a manually or automatically rejected pallet can be routed by the rework-return routing station 234*a* to the reject station 238*a*, for pick-up by a forklift, which can transport the pallet to a working area 240. At working area 240, for example, more involved operations can be performed by workers for rectifying problems with pallets (e.g., fixing a broken pallet, swapping one type of pallet for another type of pallet, repacking goods on a pallet, etc.). After the problems with a pallet have been rectified, for example, the pallet can be again provided to the intake conveying system 210*a*, by using a pallet-moving vehicle to deliver the pallet to the receiving station 212*a* of the first inbound conveying lane, to the receiving station of the second inbound conveying lane, or to a spur-in receiving station 242*a*.

In general, some intake conveying systems can be configured to include a spur-out lane that can provide convenient access to one or more special operations that may be performed on pallets (e.g., rectifying difficult problems, blast freezing operations, or other special operations), and a spur-in lane that can return the pallets after the special operations have been performed. In the present example, the intake conveying system 210*a* includes a spur-out lane that extends from the routing station 218*a* to a spur-out providing station 242*a*. The routing station 218*a*, for example, can be adapted to selectively provide pallets to the spur-out lane, in addition to the providing station 220*a* and the rework conveying lane 222*a*. The spur-out providing station 242*a*, for example, can be adapted to provide pallets to pallet-moving vehicles (e.g., forklifts, or other manual or automated vehicles). The intake conveying system 210*a* in the present example also includes a spur-in lane that extends from a spur-in receiving station 244*a* to the first inbound conveying lane (e.g., indicated by arrow 208). The spur-in receiving station 244*a*, for example, can be adapted to receive pallets from pallet-moving vehicles. The intake conveying system 210*b* (shown in FIG. 2B), however, does not include spur-out/spur-in lanes.

As described above, after a pallet satisfies criteria for proceeding past the intake conveying system 210*a*, the pallet can be routed to one of the intake conveying system's providing stations (e.g., providing station 220*a*). While at one of the providing stations, for example, the pallet can eventually be released to pallet transport system 250 (e.g., a conveyor system, a system of rail guided vehicles (RGVs), a monorail system, a system of automated guided vehicles (AGVs), a system of manually operated pallet-moving vehicles, or another suitable system) of the warehouse environment 200. The pallet transport system 250 can move pallets from the intake conveying system 210*a* to a storage conveying system 260 of the warehouse environment 200, and to move pallets from the storage conveying system to an outbound conveying system 270 of the warehouse environment. In general, each system of the warehouse environment 200 can be configured to perform a separate task (e.g., under the control of one or more computing devices of the system), and can be relatively independent of the other systems. Coordination between the systems can be facilitated through a general warehouse management system that monitors and provides instructions to the systems in the warehouse environment 200 and/or by optimizing the operations of the pallet transport system 250, which can serve as a physical interface between the various other systems.

In the present example, the pallet transport system 250 is adapted to convey pallets in a vehicle-traversing loop 252. In some implementations, the vehicle-traversing loop 252 can be a rail loop (e.g., including a physical rail or multiple parallel physical rails), and the pallet conveying system 250 can include multiple rail-guided vehicles (RGVs) adapted to move pallets along the rail loop. Each rail-guided vehicle, for example, can be configured to move autonomously around the rail loop in a same direction (e.g., clockwise or counterclockwise), and to move independently from other rail-guided vehicles, without passing the other vehicles. In general, the rail-guided vehicles can move continuously if there are tasks to be performed (e.g., transporting pallets). A vehicle that is not currently transporting a pallet can generally pick up a first available pallet that it encounters, unless there is a pallet further along the loop that is designated by the computing system as having priority. When a vehicle picks up a pallet, for example, the vehicle can receive instructions for transporting the pallet, including a priority status of the pallet, a final destination for the pallet, and optionally a temporary destination for the pallet (e.g., when the pallet is to be sent to and dropped off at the temporary destination until such time that the pallet is to be moved to its final destination).

In general, a pallet's destination can be designated or updated when the pallet is picked up by a vehicle, when the vehicle transporting the pallet passes a communication point, and/or when the vehicle arrives at the pallet's destination. For example, the vehicle-traversing loop 252 can include multiple communication points (not shown) spaced along the loop at which a vehicle may receive updated instructions for handling a pallet. While a pallet is moving a pallet to a destination and passes a communication point (or arrives at the destination), for example, the vehicle can receive instructions that updates a pallet's destination (e.g., a final destination or a temporary destination) to a different destination, and/or that updates the pallet's priority status. If the current destination of an outbound pallet is a receiving station of an outbound conveying lane, for example, a determination of whether all pallets of a lower loading sequence have already been received by the receiving station, and if not, the pallet's destination can be updated to a temporary storage location. As another example, if the current destination of an outbound pallet is a temporary storage location, a determination of whether all pallets of a lower loading sequence have been received by the pallet's final destination (e.g., a receiving station of an outbound conveying lane), and if so, the pallet's current destination can be updated to the receiving station. As another example, if the current destination of an inbound pallet is an into-storage conveying lane, and the lane is congested when the pallet arrives at the lane, the pallet's destination can be updated to that of a receiving station of an into-storage conveying lane that leads to another crane, or a nearest temporary storage location that is upstream of the pallet's original destination lane. Thus, the pallet transport system 250 can perform dynamic adjustments to better ensure that bottlenecks are reduced, and that a pallet arrives at its final destination on time and in order.

The rail-guided vehicles can include sensors, pallet handling equipment, computer control mechanisms, and communication devices that enable each vehicle to receive instructions (e.g., picking up a single pallet at a first location and dropping off the pallet at a second location) and to perform operations according to the instructions, without colliding with another vehicle. For example, each rail-guided vehicle can include conveyors that are configured to roll a pallet on or off the vehicle. When at a pallet providing station, for example, the rail-guided vehicle can communicate with the station, and the vehicle and the station can perform a coordinated action to transfer a pallet from the station to the vehicle (e.g., the station can roll off the pallet while the vehicle rolls on the pallet). Similarly, when at a pallet receiving station, for example, the rail-guided vehicle can communicate with the station, and the vehicle and the station can perform a coordinated action to transfer a pallet from the vehicle to the station (e.g., the station can roll on the pallet while the vehicle rolls off the pallet).

In some implementations, a vehicle-traversing loop may include multiple sub-loops, such that the multiple vehicles are able to traverse from a first side of the loop to a second side of the loop via each of multiple paths. For example, the vehicle-traversing loop 252 includes a shortcut 254 that enables a vehicle (e.g., travelling in a counter-clockwise direction around the loop 252 toward the portion of the warehouse environment 200 shown in FIG. 2B) to travel from a pick-up location of the storage conveying system 260 to a drop-off location of the outbound conveying system 270, without traversing around the entire loop 252—thus saving travel time and power consumption. In the present example, the vehicle-traversing loop 252 also includes a loop extension 256, at which vehicles may be serviced and/or recharged. Referring again to FIG. 2B, for example, the loop 252 can also include an off-loop section 258, at which vehicles can be idle when not in use. For example, the number of vehicles travelling around the loop 252 can be adjusted according to the number of tasks to be performed by the vehicles in the warehouse environment 200, and excess vehicles can be parked within the off-loop section 258.

Referring again to FIG. 2A, the storage conveying system 260 includes multiple into-storage conveying lanes (e.g., into-storage conveying lane 262) and multiple from-storage conveying lanes (e.g., from-storage conveying lane 264). Each into-storage conveying lane, for example, can be arranged to move pallets from the vehicle-traversing loop 252 to the storage area 206a (e.g., via a pallet receiving station of the into-storage conveying lane that is adjacent to the loop and is configured to receive a pallet from a vehicle). Each from-storage conveying lane, for example, can be arranged to move pallets from the storage area 206a to the vehicle-traversing loop 252 (e.g., via a pallet providing station of the from-storage conveying lane that is adjacent to the loop and is configured to provide a pallet to a vehicle). In the present example, into-storage conveying lanes and from-storage conveying lanes are alternated, with each conveying lane being serviced by one or two cranes, and each crane servicing an into-storage conveying lane and a from-storage conveying lane. For example, crane 266 can service both the into-storage conveying lane 262 (e.g., by receiving a pallet from the lane and placing the pallet in a suitable location in the storage area 206a), and the from-storage conveying lane 264 (e.g., by retrieving a pallet from the storage area 206a and placing the pallet on the lane for routing to the vehicle-traversing loop 252).

A pallet that is retrieved from the storage area 206a can be routed by the storage conveying system 260 to a pallet providing station of one of the from-storage conveying lanes. When the pallet arrives at the pallet providing station, or at an appropriate time after the pallet arrives, for example, the storage conveying system 260 can notify the pallet transport system 250 that the pallet is available to be picked up. One of the vehicles can stop at the pallet providing station, for example, and the pallet can be transferred from the pallet providing station to the vehicle. Also, the vehicle can receive instructions that designate a destination location for the pallet (e.g., a particular receiving station along the vehicle-traversing loop 252), and optional instructions that specify whether the pallet is prioritized. Possible destination locations for the pallet include a receiving station of the intake conveying system 210a (e.g., for eventual routing of the pallet to the working area 240), a receiving station of the outbound conveying system 270 (e.g., for routing to the outbound dock area 204a and placement on a delivery vehicle), a receiving station of an elevator (e.g., for routing to another level of the warehouse environment 200), or a storage area along the vehicle-traversing loop 252 (e.g., for temporary storage as system bottlenecks are resolved).

In the present example, the outbound conveying system 270 includes multiple outbound conveying lanes (e.g., outbound conveying lane 272). Each outbound conveying lane can be configured to transfer pallets from the vehicle-traversing loop 252 to the outbound dock area 204a. For example, the outbound conveying lane 272 includes a pallet receiving station 274 that is adjacent to the vehicle-traversing loop 252 and is configured to receive a pallet from a loop vehicle. After the pallet is received, the pallet can be routed along the outbound conveying lane 272 to a location 276 (e.g., a receiving station) at the end of the lane, where it can be picked up by a suitable pallet-moving vehicle for loading on a delivery vehicle.

One or more pallet elevators (e.g., pallet elevator 280) can be included in the warehouse environment 200, for routing pallets between different levels. In general, a pallet elevator can be configured to receive pallets from vehicles on a first level of a building that includes a pallet-conveying system (e.g., including the various systems shown in FIGS. 2A-2B), and to provide the received pallets to a second level of the building. Similarly, the pallet elevator can be configured to receive pallets from the second level of the building and to provide the received pallets to the first level of the building. For example, the warehouse environment 200 can include a second level that includes stations for unloading products from various pallets and reloading the products to other pallets according to specified instructions. In general, pallets that are received by a warehouse may be loaded with a single type of product, whereas pallets that are to be shipped from the warehouse may be loaded with multiple different types of products, per a customer's order. Pallets of products can be prepared on the second level per the order in advance of a delivery vehicle arriving, for example, and the pallets can then be sent back down to the storage area 206a for storage until a suitable time for retrieving the pallets for a shipment. In the present example, the pallet elevator 280 is located within the interior of the vehicle-traversing loop 252. The pallet elevator 280, for example, can be configured to receive pallets from vehicles of the vehicle-traversing loop 252 via an inbound-elevator conveying lane 282 (e.g., including a pallet receiving station that is adjacent to the vehicle-traversing loop 252) that transfers pallets from the loop to the elevator. The pallet elevator 280, for example, can also be configured to provide pallets to vehicles of the vehicle-traversing loop 252 via an outbound-elevator conveying lane 284 (e.g., including a pallet providing station that is adjacent to the vehicle-traversing loop 252) that transfers pallets from the elevator to the loop.

Multiple pallet storage locations (e.g., pallet stands) can be included in the warehouse environment 200, for temporarily storing pallets as system bottlenecks are resolved and/or as proper pallet sequences are established. For example, delivery vehicles are generally loaded according to a planned sequence of pallets or pallet classes (e.g., with multiple different pallets having similar characteristics being in a same pallet class, and each pallet in a pallet class being swappable with another pallet in the pallet class when loading a delivery vehicle). Since pallets are loaded in a delivery vehicle from the front of the vehicle to the back of the vehicle, providing the pallets to the outbound dock area 204a according to the loading order can facilitate loading of the vehicle.

Occasionally, pallets may be retrieved from storage such that a pallet at a pallet providing station of a from-storage conveying lane is blocking another pallet that has a lower loading sequence (e.g., when multiple retrieval cranes are simultaneously retrieving pallets for a delivery order). In such cases, for example, pallets can temporarily be moved to pallet stands and/or vehicle actions can be coordinated along the vehicle-traversing loop to resolve bottlenecks and/or loading sequence issues. In the present example, the multiple pallet stands (e.g., pallet stand 290a) are located within the interior of the vehicle-traversing loop 252. Each of the pallet stands can be configured to accept a single pallet at a time, for example. In general, the pallet stands can be bi-directional, and each pallet stand can be configured to serve as both a pallet receiving station and a pallet providing station. For example, the pallet stand 290 can be configured to receive a pallet from the vehicle-traversing loop 252 by moving the pallet in a first direction (e.g., away from the loop), and to return the pallet to the loop by moving the pallet in a second, opposite direction (e.g., toward the loop).

Figure 3:
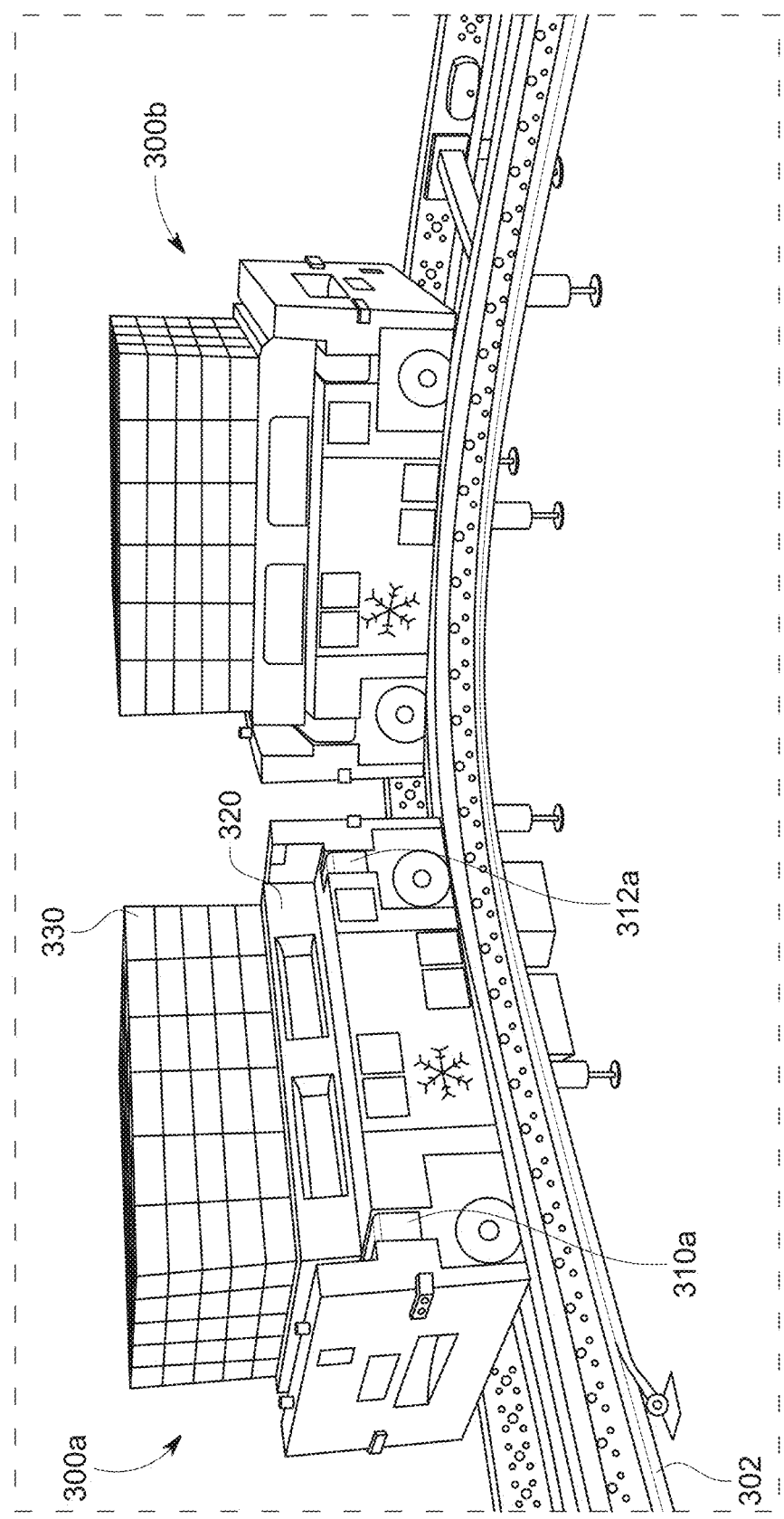
FIG. 3 illustrates an example of rail guided vehicle (RGVs) on a rail system.

FIG. 3 illustrates an example of rail guided vehicles (RGVs) on a rail system. The RGVs can be used for the RGVs described throughout this document. In the present example, RGV 300a can be configured to travel through a warehouse along a rail 302, independently from other RGVs (e.g., RGV 300b). The RGVs (e.g., RGV 300a) shown in the present example include pallet conveying devices 310a and 312a. The pallet conveying devices 310a, 312a, for example, can be configured to enable the RGV 300a to receive, support, and provide a pallet 320, on which may be loaded various goods (e.g., goods 330). To pick up pallet 320, for example, the RGV 300a can move along the rail 302 and stop at a pallet providing station (e.g., any of the pallet providing stations or pallet stands described throughout this document) that is to release a pallet. The pallet providing station, for example, can roll off the pallet 320 while the RGV 300a rolls on the pallet (e.g., by activating its pallet conveying devices 310a, 312a), until the pallet is positioned correctly on the RGV 300a. To drop off pallet 320, for example, the RGV 300a can move along the rail and stop at a pallet receiving station (e.g., any of the pallet receiving stations or pallet stands described throughout this document) that is to accept a pallet. The pallet receiving station, for example, can roll on the pallet while the RGV 300a rolls off the pallet (e.g., by activating its pallet conveying devices 310a, 312a), until the pallet is positioned correctly on pallet receiving station. Pallets can be received or provided from either side of the RGV 300a, for example.

Figure 4:
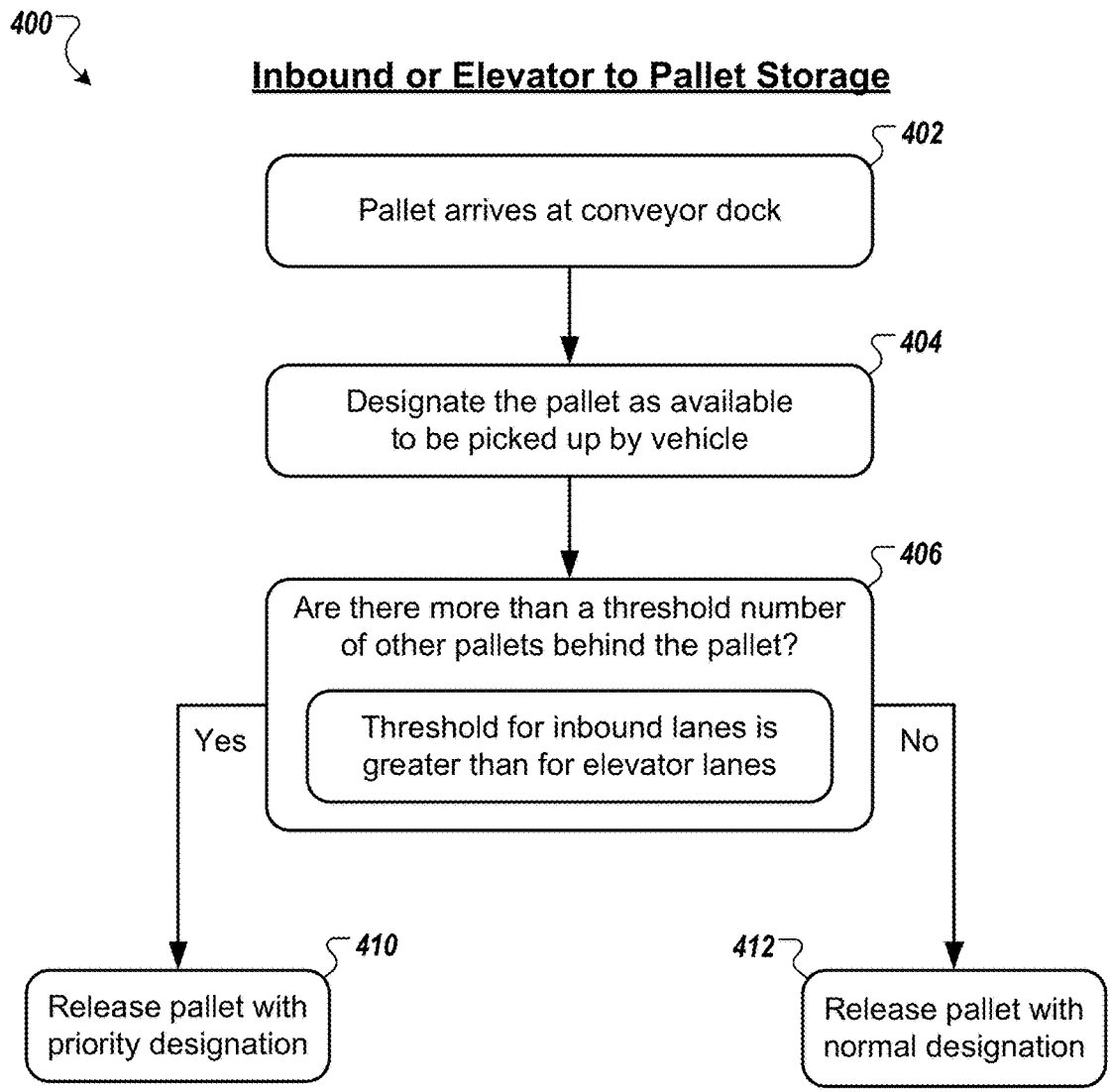
FIG. 4 is a flowchart of an example technique for moving pallets from an inbound dock area or an elevator to a pallet storage area.

FIG. 4 is a flowchart 400 of an example technique for moving pallets from an inbound dock area or an elevator to a pallet storage area. In general, the technique can be performed by one or more computing systems (e.g., a warehouse management system and/or various subsystems) of a warehouse environment (e.g., warehouse environment 200, shown in FIGS. 2A-2B), and will be described with respect to FIGS. 2A-2B for purposes of clarity. In general, the objective of this technique is to ensure that pallets are picked up in such a way that there is not a queue on a conveying lane that causes unloading equipment (e.g., pallet-moving vehicles) to be unable to unload pallets from the conveying lane.

A pallet can arrive at a conveyor dock (402). For example, a pallet can arrive at pallet providing station 220a, which is situated at the end of inbound conveying lane 208 of the intake conveying system 210a, adjacent to the vehicle-traversing loop 252. As another example, a pallet can arrive at a conveyor dock at the end of outbound elevator conveying lane 284, adjacent to the vehicle-traversing loop 252.

The pallet can be designated as available to be picked up by a vehicle (404). For example, the warehouse management system or an appropriate subsystem (e.g., the intake conveying system, when the pallet is at the pallet providing station 220a, or an elevator conveying system, when the pallet is at a conveyor dock at the end of outbound elevator conveying lane 284) can provide a notification to the pallet transport system 250 that the pallet is available to be picked up by one of the vehicles.

A determination can be performed of whether there are more than a threshold number of other pallets behind the pallet (406). In some implementations, the threshold for inbound lanes can be greater than for elevator lanes. As shown in FIG. 2A, for example, the inbound conveying lane 208 includes spaces for two pallets between the photographing location 214a and the providing station 220a, whereas the outbound elevator conveying lane 284 includes a space for only a single pallet at its conveyor dock. If another pallet begins to come down the elevator 280, the outbound conveying lane 284 would be congested. On the other hand, the inbound conveying lane 208 may be congested if a pallet is blocked by other pallets after being photographed. Thus, in the present example, the threshold number of pallets for the inbound conveying lane 208 may be three pallets, whereas the threshold number of pallets for the outbound elevator conveying lane 284 may be one pallet.

If there are more than a threshold number of other pallets behind the pallet, the pallet can be released with a priority designation (410). When a pallet is designated as having priority, for example, the pallet may be picked up by a vehicle on the vehicle-traversing loop 252 more quickly than other pallets. For example, the first empty vehicle to encounter the high-priority pallet can pick it up. As another example, the closest empty upstream vehicle to the high-priority pallet can ignore requests to pick up pallets with normal priority, and then pick up the high-priority pallet when the vehicle arrives at the pallet's conveyor dock or providing station. As another example, the closest loaded upstream vehicle carrying a pallet with normal priority can unload its pallet at a pallet stand, and then pick up the high-priority pallet when it arrives at the high-priority pallet's conveyor dock or providing station.

If there are not more than a threshold number of other pallets behind the pallet, the pallet can be released with a normal designation (412). For example, the first empty vehicle to encounter the normal-priority pallet can pick it up, unless the vehicle is on its way to pick up a high-priority pallet.

Figure 5:
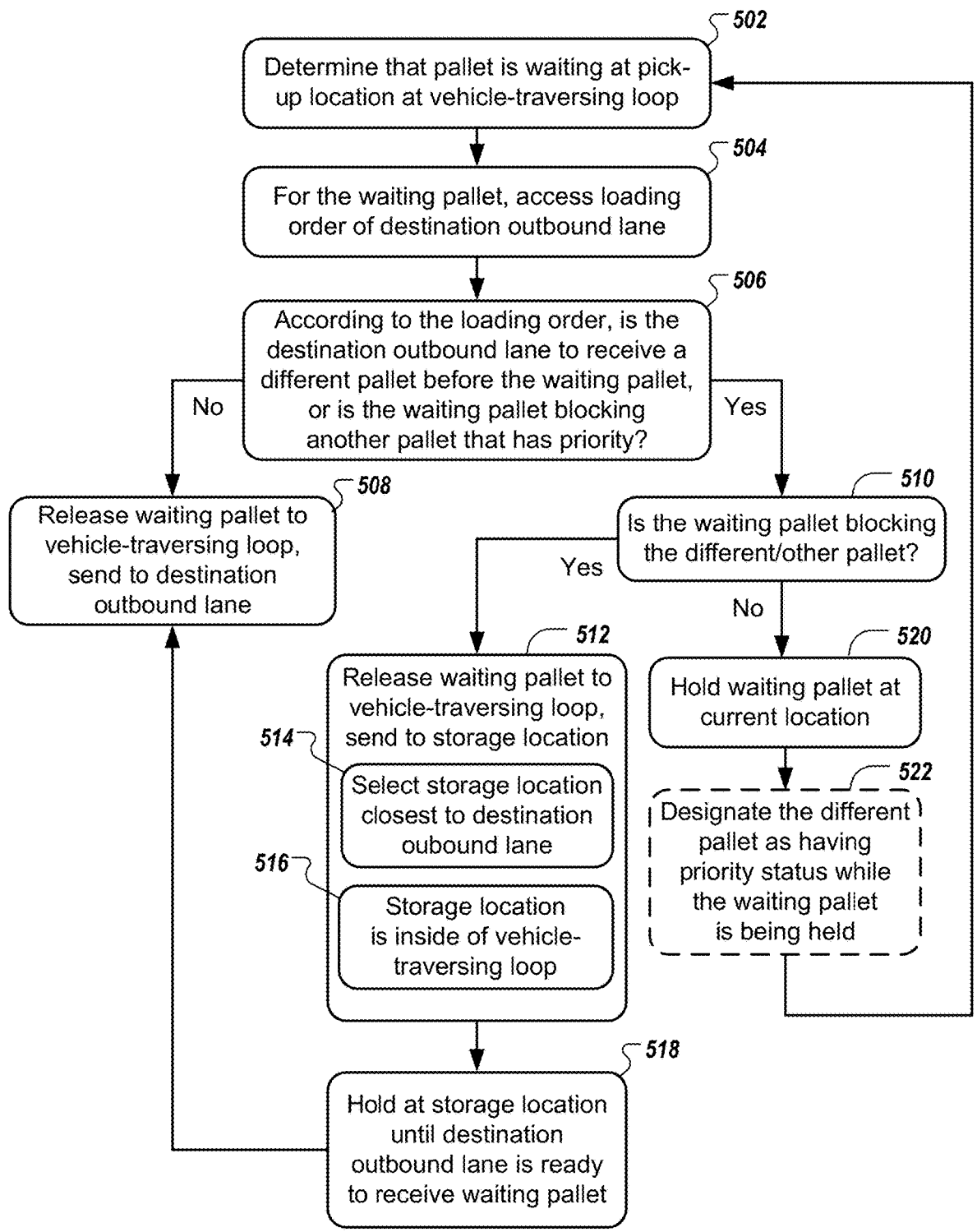
FIG. 5 is a flowchart of an example technique for moving pallets from a pallet storage area to an outbound dock area.

FIG. 5 is a flowchart 500 of an example technique for moving pallets from a pallet storage area to an outbound dock area. In general, the technique can be performed by one or more computing systems (e.g., a warehouse management system and/or various subsystems) of a warehouse environment (e.g., warehouse environment 200, shown in FIGS. 2A-2B), and will be described with respect to FIGS. 2A-2B for purposes of clarity. In general, the objective of this technique is to ensure that pallets to be loaded on a delivery vehicle arrive at an outbound conveying lane according to a correct loading sequence for the vehicle, and within a limit of a scheduled vehicle loading time, while avoiding a queue on a from-storage conveying lane that may cause a crane to be unable to provide pallets to the conveying lane.

A determination can be performed that a pallet is waiting at a pick-up location at a vehicle-traversing loop (502). In general, the determination can include determining whether a first pallet has been or is going to be conveyed by a first conveying system (e.g., the storage conveying system 260) to a pick-up location at a vehicle-traversing loop, around which multiple vehicles are configured to travel and move pallets. For example, the warehouse management system or the storage conveying system 260 can determine that a pallet has arrived (or is about to arrive) at a providing station at the end of from-storage conveying lane 264, the pallet having been retrieved from storage area 206a by a crane earlier than its scheduled arrival time at a designated outbound conveying lane. The first pallet (e.g., a waiting pallet) can have a destination of a second conveying system that is arranged to move pallets away from the vehicle-traversing loop. The second conveying system (e.g., the outbound conveying system 270) can include an outbound conveying lane arranged to move pallets from the vehicle-traversing loop to a docking area. For example, the destination of the waiting pallet can be pallet receiving station 274 of outbound conveying lane 272 of the outbound conveying system 270, which is configured to move pallets from the vehicle-traversing loop 252 to the outbound dock area 204. The vehicle-traversing loop 252 can include a rail system, and the multiple vehicles that continually and independently traverse the loop 252, picking up and dropping off pallets along the way, can include rail-guided vehicles (RGVs).

For the waiting pallet, a loading order of its destination outbound lane can be accessed (504) (and the loading orders of other outbound conveying lanes of the outbound conveying system 270 can also be accessed, for example, when multiple delivery vehicles are being loaded concurrently), and a determination can be performed of whether the destination outbound lane is to receive a different pallet before the waiting pallet, according to the loading order (506) (or whether the waiting pallet is blocking another pallet that has priority, such as a pallet that is to be received by another outbound lane). In general, the determination can include identifying whether a second conveying system (e.g., the outbound conveying system 270) is designated to receive a second pallet (e.g., the different pallet or the other pallet) from the vehicle-traversing loop 252 before a first pallet (e.g., the waiting pallet), and determining whether the second pallet (the different pallet or the other pallet) has been received by the second conveying system, or will be received by the second conveying system before the first pallet (the waiting pallet) will arrive. For example, the warehouse management system can access a loading order for the outbound conveying lane 272 (e.g., including a sequence of pallets to be loaded on a delivery vehicle serviced by the lane), and possibly, the loading orders of other outbound conveying lanes, and can determine which pallets have already been received by pallet receiving station 274 (and possibly, other pallet receiving stations for other lanes that are servicing the delivery vehicle or other delivery vehicles), and which pallets will soon be received by the station(s) (e.g., downstream pallets that are being transported on the vehicle-traversing loop 252 to the pallet receiving station(s)).

In some implementations, determining whether a different pallet has arrived before a waiting pallet can be based in part on whether the different pallet and the waiting pallet are of a same class (e.g., the pallets have substantially similar characteristics, and are thus swappable), or are of different classes (e.g., the pallets have substantially different characteristics, and are thus not swappable). If two pallets are of different classes, for example, a loading order (e.g., a sequence of pallets to be loaded on a vehicle and/or to arrive at an outbound conveying lane) can be used to make the determination. However, if two pallets are of the same class, for example, the loading order may not strictly apply, as the two pallets can be interchangeable during a loading operation.

If the destination outbound lane is not to receive a different pallet, the waiting pallet can be released to the vehicle-traversing loop, and sent to the outbound lane (508). For example, a determination can be performed that the second pallet (e.g., the different pallet) has already been transported by a vehicle of the vehicle-traversing loop 252 to the second conveying system (e.g., the outbound conveying system 270) and has been received by the second conveying system, and that the second conveying system is not congested and can receive the pallet. In response to the determination, for example, the first pallet (e.g., the waiting pallet) can be released from its pick-up location to the vehicle-traversing loop 252 with the destination being the second conveying system. For example, the warehouse management system or the storage conveying system 260 can notify the pallet transport system 250 that the pallet waiting at the providing station at the end of from-storage conveying lane 264 is available for pick-up, and the first empty vehicle that arrives along the vehicle-traversing loop 252 can stop at the providing station and pick up the pallet.

If the destination outbound lane is to receive a different pallet, a determination can be performed of whether the waiting pallet is blocking the different pallet (510), or is blocking another pallet that has priority. In general, the determination can be performed responsive to determining that a second pallet (e.g., the different pallet or the other pallet that has priority) has not been received by a second conveying system (e.g., the outbound conveying system 270) or will not be received by the second conveying system before a first pallet (e.g., the waiting pallet). The determination can generally include determining whether the first pallet (the waiting pallet) is blocking the second pallet (the different pallet or another pallet that has priority) from being conveyed by a first conveying system (e.g., the storage conveying system 260) to the vehicle-traversing loop 252. For example, the warehouse management system or the storage conveying system 260 can determine that the pallet waiting at the providing station at the end of the from-storage conveying lane 264 is in front of a different/other pallet on the lane 264 and is blocking the pallet that is on the lane from reaching the vehicle-traversing loop 252.

If the waiting pallet is blocking the different/other pallet, the waiting pallet can be released to the vehicle-traversing loop, and sent to a storage location (512). In general, responsive to determining that a first pallet (e.g., the waiting pallet) is blocking a second pallet (e.g., the different pallet or another pallet that has priority) from being conveyed by a first conveying system (e.g., the storage conveying system 260) to the vehicle-traversing loop 252, the first pallet (the waiting pallet) can be released from a pick-up location to the vehicle-traversing loop, and the destination of the first pallet (the waiting pallet) can be designated as a storage location that is different from a second conveying system (e.g., the outbound conveying system 270) and that is served by the vehicle-traversing loop 252. The storage location can be a pallet stand configured to receive and store a single pallet at a time from the vehicle-traversing loop 252, and can be located within an interior of the loop.

A storage location closest to the destination outbound lane can be selected (514). Multiple pallet stands can be located within the interior of the vehicle-traversing loop 252, for example. In general, selecting a storage location closest to the destination outbound lane can include selecting the pallet stand from among the multiple pallet stands to designate as the storage location for a first pallet (e.g., the waiting pallet), as a result of the pallet stand being a nearest-available pallet stand, of the multiple pallet stands, that is located upstream of a second conveying system. In the present example, pallet stand 290b is the closest pallet stand that is upstream to the pallet receiving station 274 of the outbound conveying lane 272 (e.g., being across the loop from the receiving station), and would be selected if available (e.g., if another pallet were not at the pallet stand). If the pallet stand 290b were to be unavailable, however, pallet stand 290c would be selected (if available), being the next closest available pallet stand that is upstream to the pallet receiving station 274 of the outbound conveying lane 272.

The storage location can be inside of the vehicle-traversing loop (516). For example, each of the pallet stands 290a, 290b, 290c, are inside of the vehicle-traversing loop 252. In other examples, one or more storage locations (e.g., pallet stands) can be outside of the vehicle-traversing loop 252.

The waiting pallet can be held at the storage location until the destination outbound lane is ready to receive the waiting pallet (518). For example, if the pallet stand 290b were to be available, the pallet providing station of the from-storage conveying lane 264 can release the waiting pallet to a vehicle of the pallet transportation system 250 (e.g., by notifying the system 250 that the pallet is available to picked up, that its temporary destination is the pallet stand 290b, and that its final destination is the pallet receiving station 274). The vehicle can transport the waiting pallet along the vehicle-traversing loop 252 (e.g., taking the shortcut 254), and can drop off the pallet at the pallet stand 290b. The waiting pallet can remain at the pallet stand 290b until the different pallet (e.g., the pallet that had been blocked by the waiting pallet on the from-storage conveying lane 264) is picked up by a vehicle of the pallet transport system 250 and dropped off at the second conveying system (e.g., the outbound conveying lane 272 of the outbound conveying system 270). At that time, for example, the outbound conveying lane 272 can be ready to receive the waiting pallet.

When the destination outbound lane is ready to receive the waiting pallet, the pallet can be released to the vehicle-traversing loop, and sent to the destination outbound lane (508). In the present example, the pallet stand 290b can release the waiting pallet to a vehicle of the pallet transportation system 250 (e.g., by notifying the system 250 that the pallet is available to be picked up, and that its destination is the pallet receiving station 274). The vehicle can transport the waiting pallet along the vehicle-traversing loop 252 (or can possibly stay in place if the pallet stand and receiving station are directly across from each other), and can provide the pallet to the pallet receiving station 274 of the outbound conveying lane 272.

If the waiting pallet is not blocking the different pallet or another pallet that has priority, the waiting pallet can be held at its current location (520). In general, a first pallet (e.g., the waiting pallet) can be held at a pick-up location, in response to a determination that the first pallet is not blocking a second pallet (e.g., the different pallet or another pallet that has priority) from being conveyed by the first conveying system (e.g., the storage conveying system 260) to the vehicle-traversing loop 252. For example, the different pallet to be received at the pallet receiving station 274 of the outbound conveying lane 272 (or the other pallet) may be in the process of being retrieved from the storage area 206a, or may be in a different from-storage conveying lane of the storage conveying system 260, or may be at a pallet stand. If the from-storage conveying lane 264 is not congested (e.g., a threshold number of pallets are not behind the waiting pallet, and the crane 266 is able to provide pallets to the from-storage conveying lane 264), for example, the waiting pallet can continue to wait at its current location (e.g., the providing station of the from-storage conveying lane 264) until the different pallet is received at the pallet receiving station 274, or is on a downstream vehicle and is on its way to the station 274.

Optionally, the different pallet can be designated as having priority status while the waiting pallet is being held (522). In general, a second pallet (e.g., the different pallet) can be designated as having priority status while a first pallet (e.g., the waiting pallet) is being held at a first pick-up location, in response to a determination that the first pallet (the waiting pallet) is not blocking the second pallet (the different pallet) from being conveyed by the first conveying system (e.g., the storage conveying system 260) to the vehicle-traversing loop 252. For example, the different pallet can be designated as having priority status while the waiting pallet is at the providing station of the from-storage conveying lane 264. Having priority status, for example, can ensure that the different pallet is picked up by a vehicle along the vehicle-traversing loop 252 sooner, and that it arrives at its destination (e.g., the pallet receiving station 274) sooner, so that pallets to be shipped on a particular delivery vehicle arrive at the outbound dock area 204a quickly and in an order that facilitates loading of the pallets on the vehicle.

Figure 6:
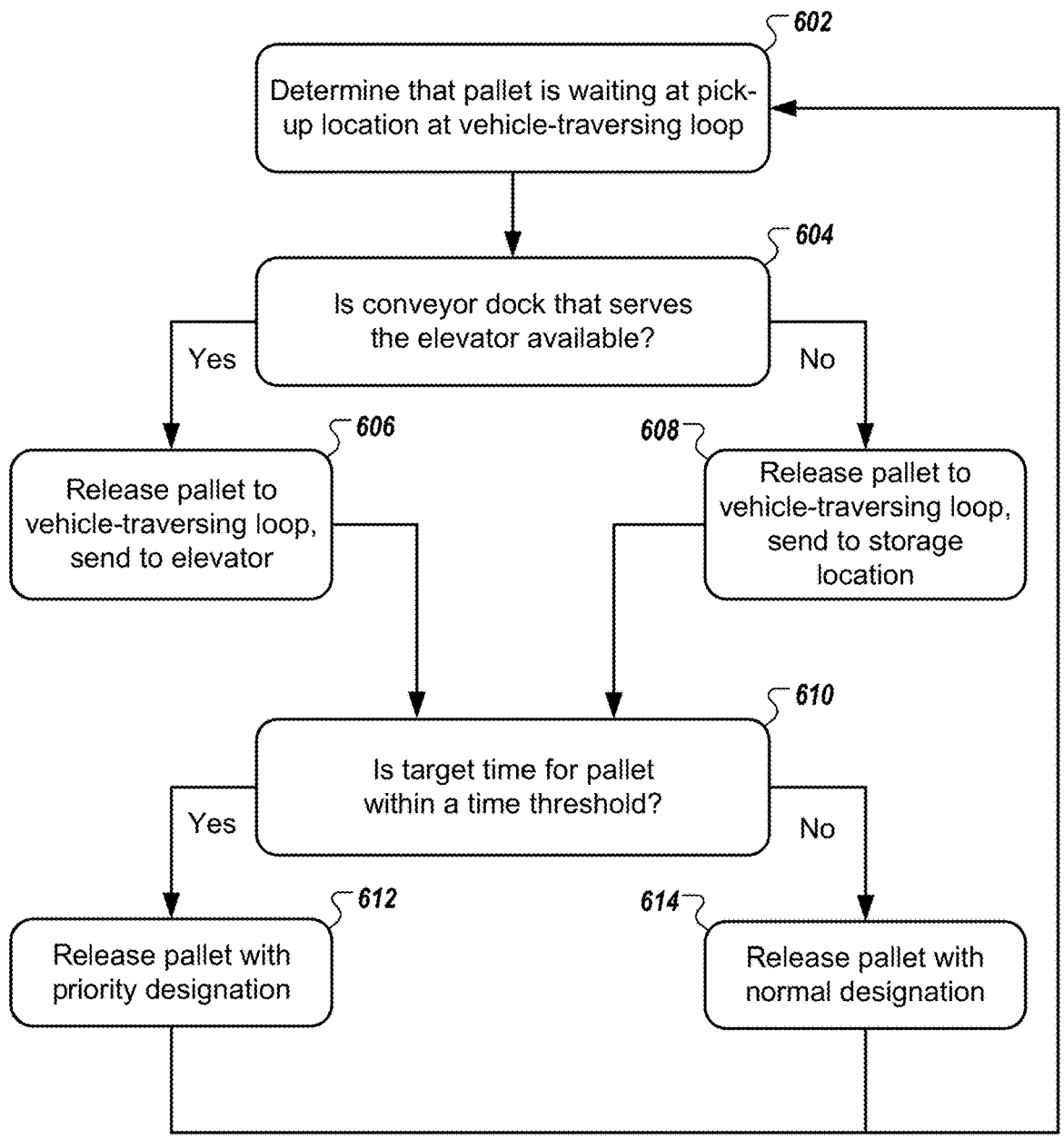
FIG. 6 is a flowchart of an example technique for moving pallets from a pallet storage area to an elevator.

FIG. 6 is a flowchart 600 of an example technique for moving pallets from a pallet storage area to an elevator. In general, the technique can be performed by one or more computing systems (e.g., a warehouse management system and/or various subsystems) of a warehouse environment (e.g., warehouse environment 200, shown in FIGS. 2A-2B), and will be described with respect to FIGS. 2A-2B for purposes of clarity. In general, the objective of this technique is to ensure that queues are avoided at a drop-off location that services an elevator, and that pallets arrive on time at their destination on another level.

A determination can be performed that a pallet is waiting at a pick-up location at a vehicle-traversing loop (602). In general, the determination can include determining that a first pallet has been or is going to be conveyed by a first conveying system (e.g., the storage conveying system 260) to a pick-up location at a vehicle-traversing loop (e.g., vehicle-traversing loop 252), around which multiple vehicles are configured to travel and move pallets. For example, the warehouse management system or the storage conveying system 260 can determine that a pallet is waiting at a pallet providing station at the end of from-storage conveying lane 264. The first pallet (e.g., a waiting pallet) can have a destination of an elevator (e.g., elevator 280) that is accessible via the vehicle-traversing loop 252. The vehicle-traversing loop 252, for example, can include a rail system, and the multiple vehicles that continually and independently traverse the loop 252, picking up and dropping off pallets along the way, can include rail-guided vehicles (RGVs). The elevator 280, for example, is located within an interior of the vehicle-traversing loop 252. An elevator-serving conveying system (e.g., including inbound elevator conveying lane 282 and outbound elevator conveying lane 284) can be arranged to move pallets from the vehicle-traversing loop 252 to the elevator 280.

A determination can be performed of whether a conveyor dock that serves the elevator is available (604). In general, the determination can include determining whether the elevator 280 itself is available, and/or whether a receiving station (e.g., a receiving station of the inbound elevator conveying lane 282) for the elevator 280 is occupied with another pallet. For example, a computing system that monitors the elevator 280 and its conveying systems can determine whether a pallet is currently at a receiving station that leads to the inbound elevator conveying lane 282 and that is configured to convey pallets to the elevator 280.

In some implementations, determining whether the elevator is available to receive a pallet can include determining whether a threshold number of pallets are located on a second conveying system that is arranged to move pallets from the vehicle-traversing loop 252 to the elevator 280. The threshold number of pallets can generally be equal to a number of pallets that can be simultaneously handled by the second conveying system. In the present example, the inbound elevator conveying lane 282 is configured to handle a single pallet at a time, and thus the threshold number of pallets would one pallet. In other examples, the inbound elevator conveying lane 282 may be configured to handle more pallets without being congested, and thus the threshold number of pallets may be greater than one.

In some implementations, determining whether the elevator is available to receive a pallet can include accounting for a number of pallets that are not yet located on the second conveying system but that are being moved to the second conveying system along the vehicle-traversing loop. For example, if a pallet is being transported by a vehicle on the vehicle-traversing loop 252, is downstream from the pallet waiting at the providing station of the from-storage conveying lane 264, and is about to be dropped off at a receiving station of the inbound elevator conveying lane, that pallet can be accounted for, along with any pallets that are already on the inbound elevator conveying lane 282. The number of pallets that are in transit can be added to the number of pallets that are already located on the second conveying system, for example, when determining a threshold number of pallets for the second conveying system.

If the conveyor dock is available, the pallet can be released to the vehicle-traversing loop, and sent to the elevator's conveyor dock (606). In general, if it had been determined that the elevator was available to receive the first pallet (e.g., the waiting pallet), the first pallet can be released from its pick-up location to the vehicle-traversing loop 252, with the destination of the first pallet being the elevator 280. For example, if the elevator 280 is available, the warehouse management system or the storage conveying system 260 can notify the pallet transport system 250 that the pallet waiting at the providing station at the end of from-storage conveying lane 264 is available for pick-up, and the first empty vehicle that arrives along the vehicle-traversing loop 252 can stop at the providing station and pick up the pallet.

If the conveyor dock is unavailable, the pallet can be released to the vehicle-traversing loop, and sent to a storage location (608). In general, the destination of the pallet can be a storage location that does not provide access to the elevator without use of the vehicle-traversing loop 252. The storage location can be a pallet stand, for example, located within an interior of the vehicle-traversing loop 252, and configured to receive and store a single pallet at a time from the vehicle-traversing loop 252. Multiple pallet stands can be located within the interior of the vehicle-traversing loop 252, for example, and selecting a pallet stand from among the multiple pallet stands to designate as a storage location for the pallet can be a result of the pallet stand being a nearest-available pallet stand, of the multiple pallet stands, that is located upstream of the elevator 280. For example, if pallet stands 290a, 290b, and 290c were the only available pallet stands in the vehicle-traversing loop, pallet stand 290a would be selected as being the nearest-available pallet stand that is upstream of the elevator 280 (even though later transporting a pallet from pallet stand 290a to the receiving station of the inbound elevator conveying lane 282 would involve turning around on the vehicle-traversing loop 252).

In the present example, the pallet providing station of the from-storage conveying lane 264 can release the pallet to the vehicle-traversing loop 252 (e.g., by the storage conveying system 260 notifying the pallet transport system 250 that the pallet is available to be picked up at the pallet providing station, that its temporary destination is the pallet stand 290a, and that its final destination is the receiving station of the inbound elevator conveying lane 282). A vehicle of the pallet transport system 250 can pick up the pallet from the pallet providing station of the from-storage conveying lane 264, can transport the pallet along the vehicle-traversing loop 252, and can drop off the pallet at the pallet stand 290a. The pallet can wait at the pallet stand 290a, for example, until such time that the elevator 280 is available. When the elevator 280 is available, for example, the pallet transport system 250 can be notified that the waiting pallet is ready to be moved to the elevator 280, and a vehicle can pick up the pallet from the pallet stand 290a and transport it to the pallet providing station of the from-storage conveying lane 264

A determination can be performed of whether a target time for the pallet is within a time threshold (610). A target time, for example, can be a time at which the pallet is scheduled to be processed by a station on another level of the warehouse environment 200. The time threshold, for example, can be a suitable amount of time based on an expected travel time from the pallet's current location to its designated location (e.g., a receiving station on another level of the warehouse environment 100), such as five minutes, ten minutes, fifteen minutes, or another suitable amount of time. If the target time for the pallet is within the time threshold, the pallet can be released with a priority designation (612). If the target time for the pallet is not within the time threshold, the pallet can be released with a normal designation (614).

Figure 7:
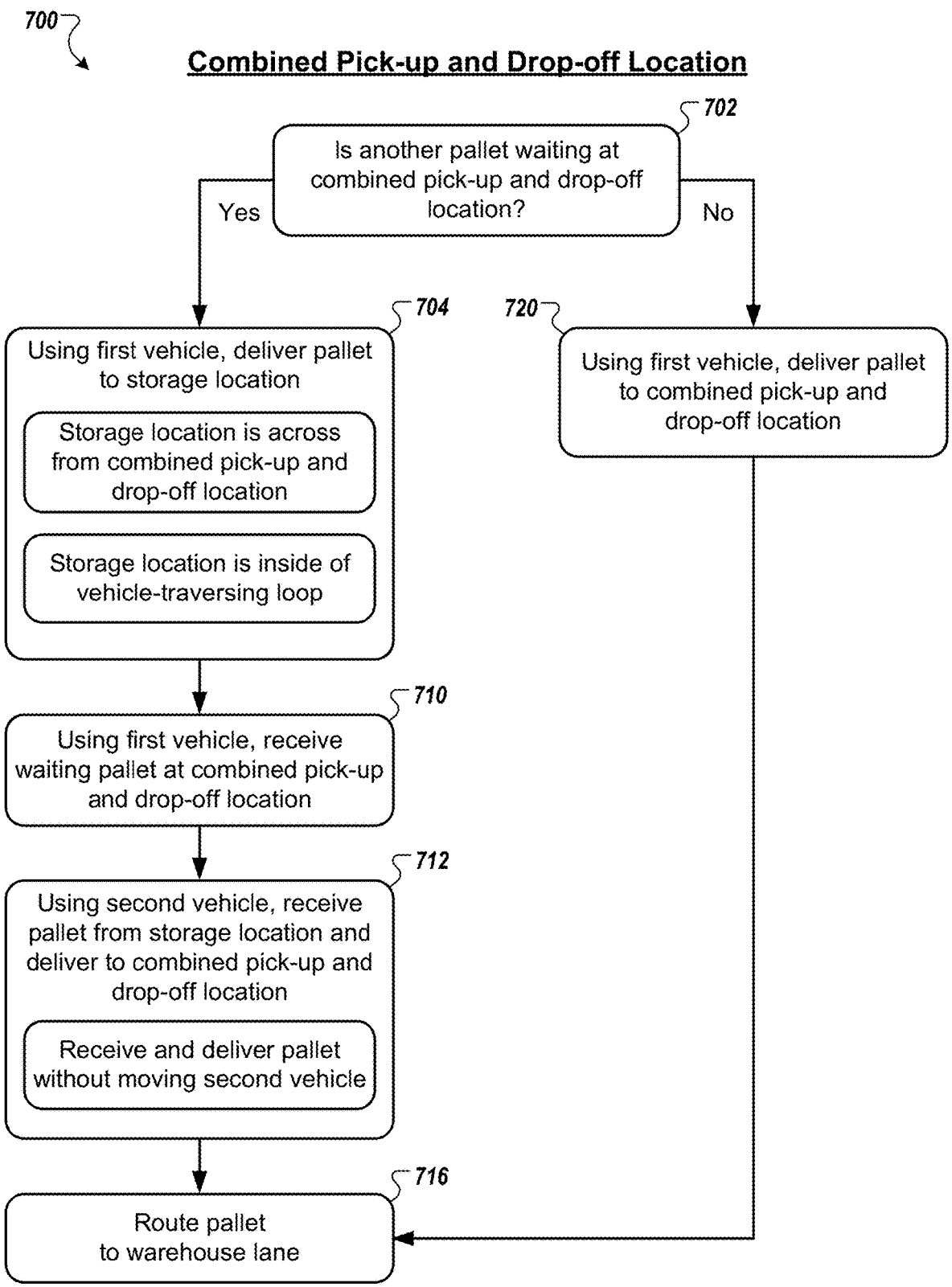
FIG. 7 is a flowchart of an example technique for moving pallets to a combined pick-up and drop-off location.

FIG. 7 is a flowchart 700 of an example technique for moving pallets to a combined pick-up and drop-off location. In general, the technique can be performed by one or more computing systems (e.g., a warehouse management system and/or various subsystems) of a warehouse environment (e.g., warehouse environment 200, shown in FIGS. 2A-2B), and will be described with respect to FIGS. 2A-2B for purposes of clarity. In general, the objective of this technique is to ensure that a combined pick-up and drop-off location is available for providing and receiving pallets in a bi-directional manner.

A determination can be performed of whether another pallet is waiting at a combined pick-up and drop-off location (702). In general, the determination can include identifying that a vehicle is moving around a vehicle-traversing loop with a first pallet that has a destination of a combined pick-up and drop-off location of a conveying system that extends away from the vehicle-traversing loop, and determining that a second pallet is located at the combined pick-up and drop-off location. The vehicle-traversing loop 252, for example, can include a rail system, and the multiple vehicles that continually and independently traverse the loop 252, picking up and dropping off pallets along the way, can include rail-guided vehicles (RGVs). The conveying system that extends away from the vehicle-traversing loop, for example, can include an inbound conveying lane (e.g., inbound conveying lane 208) arranged to direct pallets to a combined pick-up and drop-off location, and an outbound conveying lane arranged to direct pallets away from the combined pick-up and drop-off location (e.g., an outbound lane that conveys pallets to the spur-out providing station 242a). In the context of the present technique, for example, the station 220a can be a combined pick-up and drop-off location that can serve as a providing station that can provide pallets to the vehicle-traversing loop 252 from the inbound conveying lane 208, and as a receiving station that can receive pallets from the vehicle-traversing loop 252. For example, the intake conveying system 210a can be configured to receive a pallet from a vehicle of the pallet transport system 250 through station 220a, and can route the pallet to the spur-out providing station 242a for special operations performed in the working area 240.

If another pallet is waiting at the combined pick-up and drop-off location, the pallet to be transported to the combined location can be delivered to a storage location by a first vehicle (704). In general, responsive to determining that a second pallet (e.g., the other, waiting pallet) is located at a combined pick-up and drop off location, a storage location that is different from the combined pick-up and drop-off location can be designated as the destination of the first pallet (e.g., the pallet to be transported to the combined location), and the second pallet can be released to the vehicle-traversing loop 252. For example, if a pallet is to be dropped off at station 220a of the intake conveying system 210a, and another pallet is currently at the station 220a, the pallet that is to be dropped off can be routed to a temporary storage location.

As further described at (710) below, designating the destination location for the first pallet as the temporary storage location and releasing the second pallet to the vehicle-traversing loop 252 can result in the first vehicle moving the first pallet to the storage location, and then receiving the second pallet from the combined pick-up and drop-off location before the first vehicle receives any other pallet. For example, a vehicle can pick up the first pallet, move the pallet to a storage location, and drop off the pallet at the storage location. The same vehicle can then go to the combined pick-up and drop off location and pick up the second pallet, without picking up any other available pallets along the vehicle-traversing loop 252.

The storage location can be pallet stand configured to receive and store a single pallet at a time from the vehicle-traversing loop. Multiple pallet stands can be located within the interior of the vehicle-traversing loop 252, for example, and selecting a pallet stand from among the multiple pallet stands to designate as the storage location for the first pallet can be a result of the pallet stand being a nearest-available pallet stand, of the multiple pallet stands, that is located upstream of the combined pick-up and drop-off location. In some implementations, the storage location can be across from the combined pick-up and drop-off location. For example, the storage location can be a pallet stand located across a portion of the vehicle-traversing loop 252 from the combined pick-up and drop-off location, such that a vehicle can move the first pallet to the pallet stand and receive the second pallet from the combined pick-up and drop-off location without the vehicle moving along the vehicle-traversing loop 252. The storage location, for example, can be a pallet stand that is located within an interior of the vehicle-traversing loop 252, while the combined pick-up and drop-off location can be located at an exterior of the vehicle-traversing loop 252. For example, pallet stand 290d can be selected as a suitable storage location, as it is located within the interior of the vehicle-traversing loop 252, across from the station 220a (e.g., the combined pick-up and drop-off location) located at the exterior of the vehicle-traversing loop 252.

Using the first vehicle, the waiting pallet at the combined pick-up and drop-off location can be received (710). Responsive to determining that the first vehicle has received the second pallet (e.g., the waiting pallet) from the combined pick-up and drop-off location, for example, the first pallet (e.g., the pallet to be transported to the combined location) can be released from the storage location to the vehicle-traversing loop to be picked by the vehicle or another vehicle on the vehicle traversing loop, and the combined pick-up and drop-off location can be designated as the destination of the first pallet. For example, after the first vehicle picks up the second pallet (e.g., the waiting pallet) from the combined pick-up and drop-off location (e.g., station 218a), the first pallet (e.g., at pallet stand 290d) can be released from its temporary storage location by notifying the pallet transport system 250 that it is available to be picked up and moved to the combined pick-up and drop-off location (e.g. station 218a).

Using a second vehicle, the first pallet can be received from the storage location and delivered to the combined pick-up and drop-off location (712). For example, after the first vehicle departs the space between the station 220a and the pallet stand 290d, the second vehicle can arrive and stop at the space. In some implementations, the first pallet can be received and delivered without moving the second vehicle. For example, the second vehicle can roll the first pallet off the pallet stand 290d, and can then roll the first pallet on the station 220a, without moving along the vehicle-traversing loop 252. After the first pallet is delivered to the station 220a, for example, the pallet can be routed to a warehouse lane (716). For example, the first pallet can be routed along an outbound conveying lane to the spur-out providing station 242a.

If another pallet is not waiting at the combined pick-up and drop-off location, the first pallet can be delivered to the combined pick-up and drop-off location, using the first vehicle (720). For example, the first vehicle can transport the pallet along the vehicle-traversing loop 252, stop at the combined pick-up and drop-off location (e.g., the station 220a), and can roll the first pallet on the station 220a. After the first pallet is delivered to the station 220a, for example, the pallet can be routed to a warehouse lane (716). For example, the first pallet can be routed along an outbound conveying lane to the spur-out providing station 242a.

Figure 8:
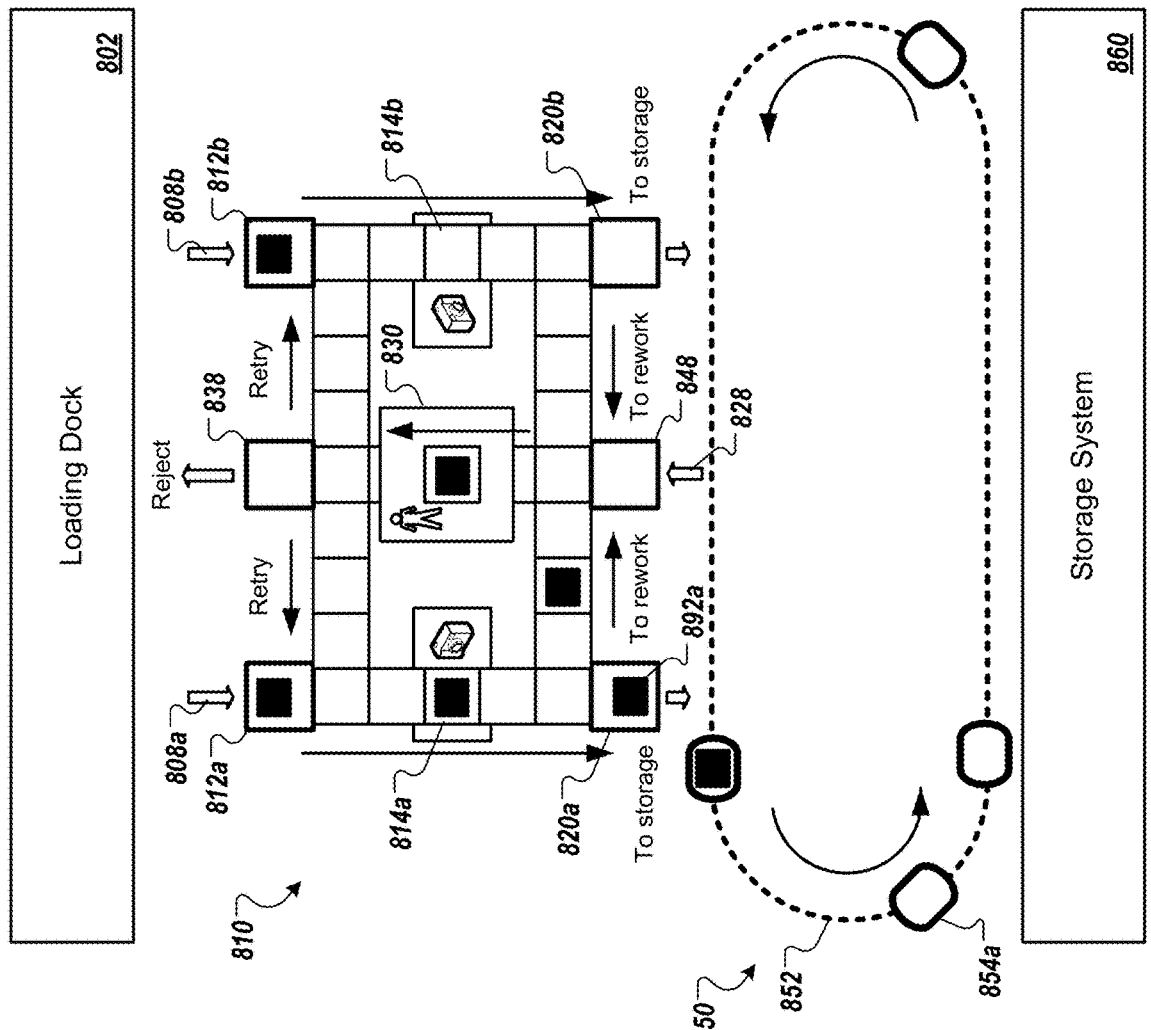
FIG. 8 conceptually illustrates a warehouse environment that includes an intake conveying system that is configured to inspect, rework, and convey inbound items received from a loading dock.

This document generally describes warehouse systems, including a common rework station that serves multiple lanes of an intake conveying system. FIG. 8 conceptually illustrates a warehouse environment 800 that includes an intake conveying system 810 that is configured to inspect, rework, and convey inbound items received from a loading dock 802. For example, items (e.g., pallets, crates, boxes, or other sorts of containers of goods) can be received by a delivery vehicle (e.g., a truck) at the loading dock 802, for storage in the warehouse environment 800 by a storage system 860 (e.g., including various conveyors, vehicles, and/or cranes). The items (e.g., item 892a) can be conveyed by the intake conveying system 810 to a transport system 850. The transport system 850, for example, can include multiple vehicles (e.g., vehicle 854a) that are configured to traverse a loop 852 (e.g., along a physical track, along wires on the floor, along marked lines, or using another sort of navigation mechanism), picking up and dropping off items on the way.

To store an item, for example, one of the vehicles can pick up the item from the intake conveying system 810, transport the item along the loop 852, and drop off the item to the storage system 860, which can convey the item to a storage area (e.g., shown in FIGS. 2A-2B). When the item is to be shipped from the warehouse environment 800, for example, the item can be retrieved from the storage area by the storage system 860 and conveyed by the system 860 to the transport system 850, where it is picked up by one of the vehicles, transported along the loop 852, and dropped off to an outbound conveying system (e.g., shown in FIGS. 2A-2B), which can then convey the item to the loading dock 802.

In addition to routing items from the loading dock 802 to the transport system 850, for example, the intake conveying system 810 can be configured to inspect received items to identify the items and to ensure that the items meet particular criteria. Items that do not meet the criteria and that are fixable at the intake conveying system 810, for example, can be reworked. Items that do not meet the criteria and that are not fixable at the intake conveying system 810, for example, can be rejected and routed away from the system 810 to a working area (shown in FIGS. 2A-2B).

As shown in FIG. 8, items can be received at multiple different receiving stations 812a, 812b of the intake conveying system 810. The items can be conveyed by the intake conveying system 810 along respective inbound conveying lanes 808a, 808b, to respective item inspection stations 814a, 814b. At the item inspection stations 814a, 814b, for example, items can be identified and inspected, using various types of sensors. If an item is identified and passes inspection according to its criteria, for example, the item can be conveyed along its respective inbound conveying lane 808a, 808b, to a respective providing station 820a, 820b, where it can be picked by a vehicle of the transport system 850.

If the item is not identified and/or does not pass inspection according to the criteria, for example, the item can be conveyed to a common rework lane 828, and then to a common rework station 830. At the common rework station 830 (e.g., a rework station that serves both the inbound conveying lane 808a and 808b), for example, workers and/or automated equipment can resolve problems of the item, if possible. After an item is reworked, for example, the item can be routed from the common rework station 830 back to one of the inbound conveying lanes 808a, 808b, and to a respective item inspection station 814a, 814b, to retry an inspection. If an item cannot be reworked (or if the item has previously failed numerous inspections), for example, the item can be routed to a reject station 838, where it can be picked up by a pallet-moving vehicle (e.g., a forklift) and transported to the working area. As another example, if an item from another location in the warehouse environment 800 (e.g., a storage area) is to be reworked, the item can be routed to a rework receiving station 848 of the intake conveying system 810, where it can be conveyed along the common rework lane 828 to the common rework station 830. In general, since a minority of items are to be reworked or are rejected, having a common rework station that serves multiple inbound lanes (and other areas of a warehouse) can conserve warehouse resources.

Figure 9:
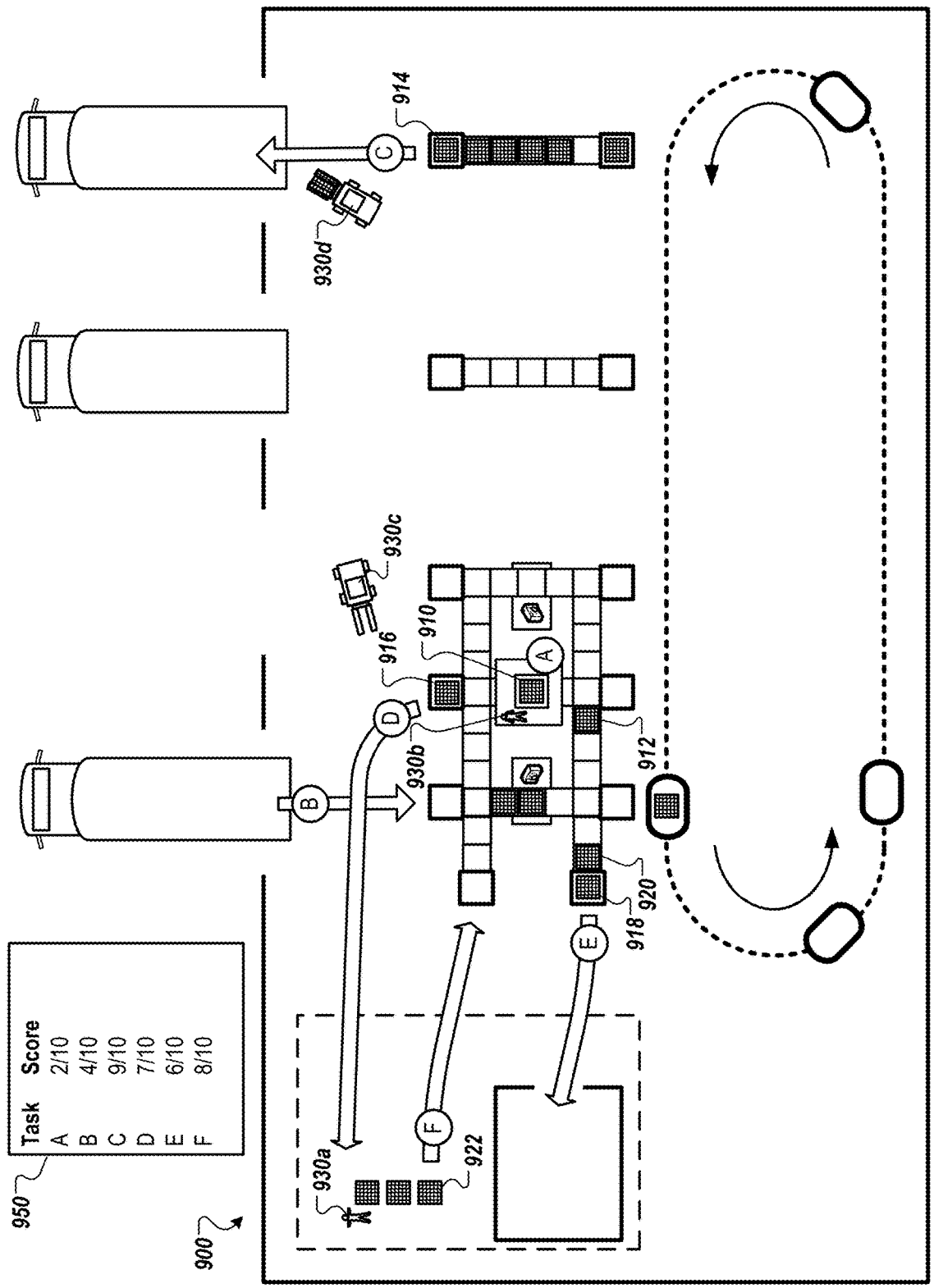
FIG. 9 conceptually illustrates a ranking and delegation of tasks to be performed in a warehouse environment.

FIG. 9 conceptually illustrates a ranking and delegation of tasks to be performed in a warehouse environment 900. In general, a warehouse management system can be notified of various tasks to be performed when pallets arrive at the warehouse environment 900 (e.g., in delivery vehicles), when pallets arrive at various pallet providing stations that are to be serviced by pallet-moving vehicles, and/or when pallets arrive at various work areas or work stations.

Figure 10:
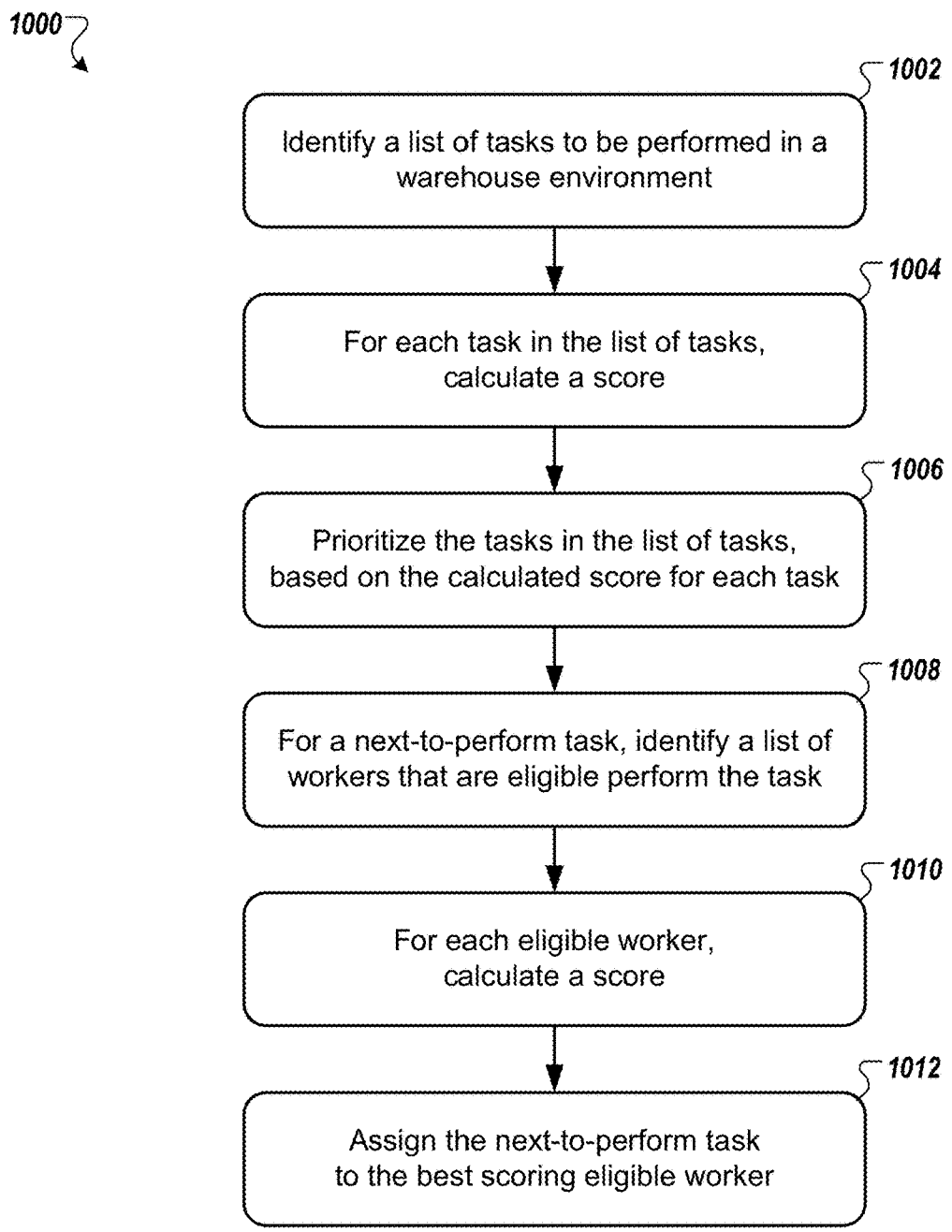
FIG. 10 is a flowchart of an example technique for ranking and delegating tasks to be performed in a warehouse environment.

Referring now to FIG. 10, for example, a flowchart 1000 of an example technique for ranking and delegating tasks to be performed in a warehouse environment is shown. In general, the technique can be performed by one or more computing systems (e.g., a warehouse management system and/or various subsystems) of a warehouse environment (e.g., warehouse environment 900, shown in FIG. 9), and will be described with respect to FIG. 9 for purposes of clarity. In general, the objective of this technique is to efficiently prioritize tasks, and to delegate tasks to suitable workers (e.g., workers who are qualified to perform the tasks and that can go to the task with a minimum amount of travel time).

A list of tasks to be performed in a warehouse environment can be identified (1002). As shown in FIG. 9, tasks A-F are to be performed in the warehouse environment 900 and have not yet been delegated to a worker.

For each task in the list of tasks, a score can be calculated (1004). Tasks can be scored, for example, based on various factors, which may vary depending on the task. In general, factors for scoring a task can include the task's target time and a queue of other tasks behind the task. Tasks can be periodically (e.g., every minute, every two minutes, every five minutes, etc.) or continually re-scored and/or re-prioritized and new tasks can be generated, for example, to account for a dynamically shifting state of the warehouse environment 900. An example scoring of tasks A-F follows.

Task A, for example, involves reworking a pallet 910 at a rework station, which can include manually adjusting goods on the pallet, unfolding or moving a label, shifting a plastic wrapping of the goods, and/or re-wrapping the goods. Factors for scoring the task, for example, can include an amount of time remaining until a target time for the task (e.g., based on how much time has elapsed since the pallet arrived at the rework station or was routed to the rework station, with a goal target time for reworking the pallet of thirty minutes), possible lane congestion behind the pallet, and a type of goods on the pallet (e.g., with particular types of goods, such as frozen goods, having a shorter target time, in order to preserve the goods). In general, a target time for a task can be compared to a projected target time for completing the task, if the task were to be present in a worker's queue. In the present example, the pallet 910 has just arrived at the rework station and is loaded with a standard type of goods, and there is only a single other pallet 912 behind the pallet 910 in the rework conveying lane. Thus, the task can be assigned a relatively low score (e.g., 2/10).

Task B, for example, involves moving a pallet from a delivery vehicle to an inbound conveying lane. Factors for scoring the task, for example, can include an amount of time remaining until a target time for the task (e.g., based on how much time has elapsed since the delivery vehicle has arrived at the dock, with a goal target time for unloading the truck being two hours), and possible congestion (e.g., a number of pallets remaining in the delivery vehicle). In the present example, the truck has been at the dock for a moderate amount of time (e.g., twenty minutes), however the queue of other tasks behind the task is relatively large (e.g., an unloading process for the truck has not yet begun and the truck is full of other pallets). Thus, the task can be assigned a moderate score (e.g., 4/10) at the present time. At a future time, when the tasks to be performed are again scored and ranked, Task B can be assigned a higher score as its target time approaches.

Task C, for example, involves moving a pallet from a providing station of an outbound lane to a delivery vehicle. Factors for scoring the task, for example, can include an amount of time remaining until a target time for the task (e.g., based on how much time has elapsed since the delivery vehicle has arrived at the dock, with a goal target time for loading the truck being two hours), and possible congestion (e.g., a number of pallets behind the pallet in the outbound lane). In the present example, the truck has been at the dock for a significant amount of time (e.g., an hour), and the queue of other tasks behind the task is relatively large (e.g., six other pallets are behind the pallet in the outbound lane, and the lane is about to become fully congested). Thus, the task can be assigned a relatively high score (e.g., 9/10).

Task D, for example, involves moving a pallet 916 from a reject station to a work area. Factors for scoring the task, for example, can include an amount of time remaining until a target time for the task (e.g., based on how long the pallet has been waiting at the reject station), and possible congestion (e.g., a number of pallets behind the pallet in the rework lane. In the present example, the pallet 916 has been waiting at the rework station for five minutes, and two other pallets (e.g., pallets 910, 912) are behind the pallet in the rework lane. Thus, the task can be assigned a moderately high score (e.g., 7/10).

Task E, for example, involves moving a pallet 918 from a spur-out providing station to a working area (e.g., for freezing in a blast freezer and/or swapping out a pallet board for a different pallet board). Factors for scoring the task, for example, can include an amount of time remaining until a target time for the task (e.g., based on how long the pallet has been waiting at the spur-out providing station), and possible congestion (e.g., a number of pallets behind the pallet in the spur-out lane, or congestion on the inbound lane that may interfere with the spur-out lane). In the present example, the pallet 918 has been waiting at the spur-out providing station for five minutes, and one other pallet (e.g., pallet 920) is behind the pallet in the spur-out lane. Thus, the task can be assigned a moderate score (6/10).

Task F, for example, involves moving a pallet 922 from a working area (e.g., where the pallet has been fixed) to a spur-in receiving station. Factors for scoring the task, for example, can include an amount of time remaining until a target time for the task (e.g., based on how long the pallet has been waiting in the working area), and possible congestion (e.g., a number of pallets behind the pallet at the working area that are also waiting for pick-up). In the present example, the pallet 922 has been waiting in the working area for thirty minutes, and two other pallets are behind the pallet and also waiting for pick-up). Thus, the task can be assigned a moderately high score (e.g., 8/10).

The tasks in the list of tasks can be prioritized, based on the calculated score for each task (1006). In the present example, according to the scored list of tasks 950, Task C (moving a pallet from a providing station of an outbound lane to a delivery vehicle) has the highest score, and thus has precedence, and is designated as the next-to-perform task.

For a next-to-perform task, a list of workers that are eligible to perform the task can be identified (1008). For example, some tasks may involve qualifications and/or experience with equipment that not all workers possess. Task A (e.g., reworking a pallet at a rework station), for example, can be assigned to a worker who is certified for reworking. Tasks B and C (e.g., moving a pallet from a delivery vehicle to an inbound conveying lane, and moving a pallet from a providing station of an outbound lane to a delivery vehicle), for example, can be assigned to a worker who performed a safety check and who is certified to operate a pallet-moving vehicle (e.g., a pallet jack, a fork lift, or another sort of lift truck). Task D (e.g., moving a pallet from a reject station to a work area), for example, can be assigned to a worker who is certified to operate a pallet-moving vehicle. Tasks E and F (e.g., moving a pallet from a spur-out providing station to a working area, and moving a pallet from a working area to a spur-in receiving station), for example, can be assigned to a specialized pallet-moving vehicle (e.g., if the pallet is going to or from a blast freezer) or a regular pallet-moving vehicle (e.g., if the pallet is going to another portion of the working area).

Information about worker qualifications and/or experience can be maintained by the warehouse management system, for example, and can be cross-referenced with task requirements for a task to potentially eliminate some workers from consideration when delegating the next-to-perform task. As shown in FIG. 9, for example, workers 930a-d are currently working in warehouse environment 930. For Task C, for example, an assigned worker is to have been certified to operate a pallet moving vehicle, and is to have performed a safety check. In the present example, only workers 930c-d meet the task requirements (and are thus considered to be eligible workers).

For each eligible worker, a score can be calculated (1010). In general, a worker's score can be based on the worker's proximity to the task, and a current length of the worker's current task queue. In some implementations, a worker's proximity to a task can be determined based on the worker's estimated proximity to the task at the completion of the last task in the worker's task queue. In the present example, worker 930d is currently closer to Task C than is worker 930c (and will also be closer to Task C after completing the last task on their task queue). If both workers have a similar number of tasks in their respective queues, for example, worker 930d would thus receive a higher score for Task C.

The next-to-perform task can be selectively assigned to the best scoring eligible worker (1012). In the present example, Task C is assigned to worker 930d. In some implementations, multiple tasks from a task list can be assigned to multiple different workers. For example, the top two, top three, or another suitable number of prioritized tasks can be distributed to workers from a list of tasks to be performed. In some implementations, tasks in a worker's queue can periodically (e.g., every minute, every two minutes, every five minutes, etc.) be reprioritized and/or reassigned. For example, circumstances in the warehouse environment 900 may shift over time, and tasks that have not yet been performed by workers can also shift in priority (and/or can shift to other workers) to reflect the changing circumstances.

Figure 11:
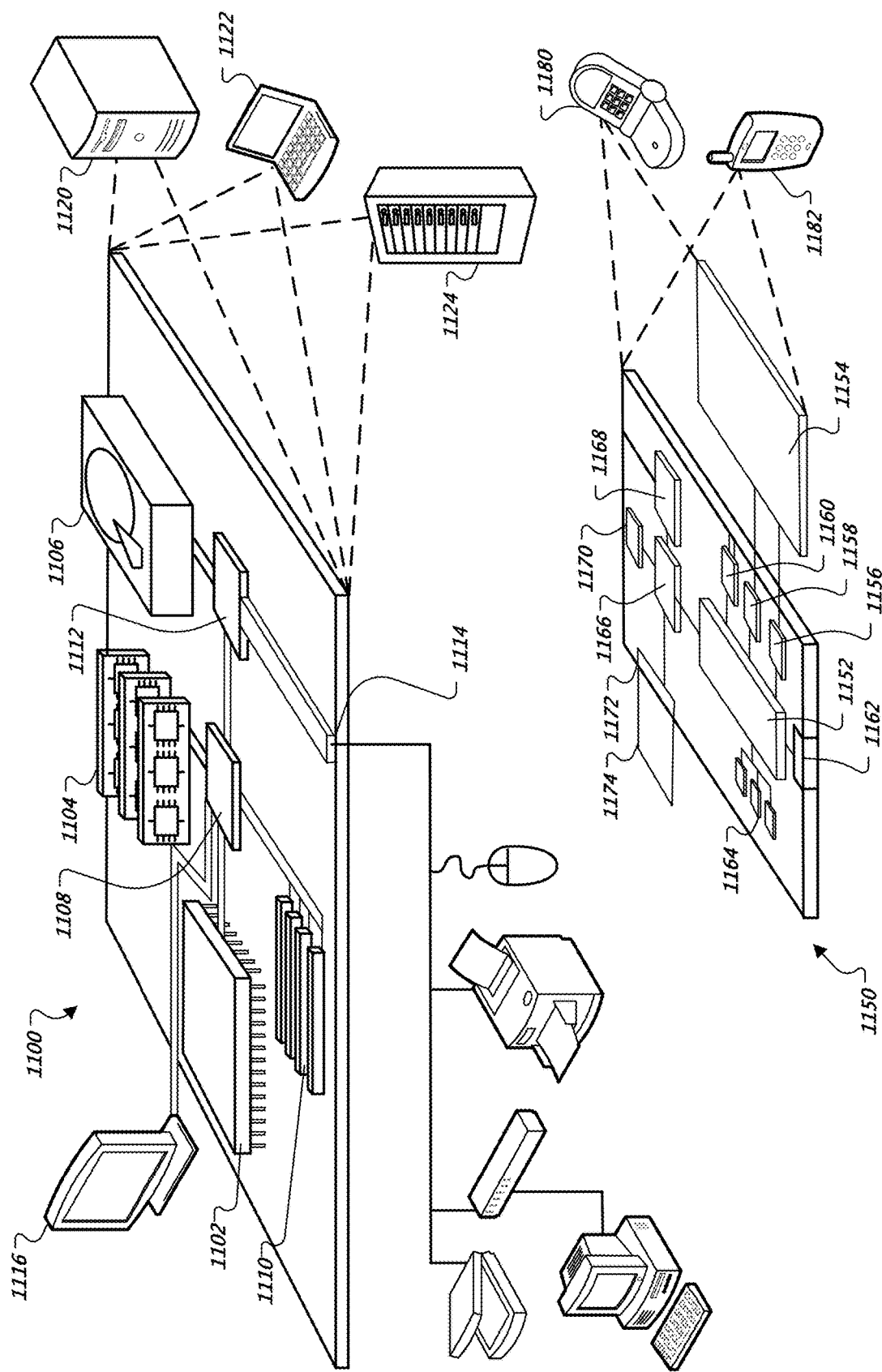
FIG. 11 is a block diagram of computing devices that may be used to implement the systems and methods described in this document, as either a client or as a server or plurality of servers.

FIG. 11 is a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1100 includes a processor 1102, memory 1104, a storage device 1106, a high-speed controller 1108 connecting to memory 1104 and high-speed expansion ports 1110, and a low speed controller 1112 connecting to low speed expansion port 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high-speed controller 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high-speed controller 1108 manages bandwidth-intensive operations for the computing device 1100, while the low speed controller 1112 manages lower bandwidth-intensive operations. Such allocation of functions is an example only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may be provided, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152 that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Additionally computing device 1100 or 1150 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A pallet-conveying system, comprising:
  a vehicle-traversing loop;
  multiple vehicles configured to travel around the vehicle-traversing loop and move pallets around the vehicle-traversing loop;
  an inbound conveying lane arranged to move inbound pallets from a docking area to the vehicle-traversing loop;
  multiple outbound conveying lanes arranged to transfer pallets from the vehicle-traversing loop to the docking area;
  an into-storage conveying lane arranged to move pallets from the vehicle-traversing loop to a storage area;
  a from-storage conveying lane arranged to move pallets from the storage area to the vehicle-traversing loop; and
  multiple pallet stands located within an interior of the vehicle-traversing loop to receive pallets from the multiple vehicles, wherein each pallet stand of the multiple pallet stands is configured to accept a single pallet at a time, and wherein each pallet stand of the multiple pallet stands is configured to receive a pallet from the vehicle-traversing loop by moving the pallet in a first direction, and return the pallet to the vehicle-traversing loop in a second direction that is opposite the first direction.

2. The system of claim 1, wherein the vehicle-traversing loop includes a physical rail, and each vehicle of the multiple vehicles is a rail-guided vehicle.

3. The system of claim 1, wherein the vehicle-traversing loop includes multiple sub-loops, such that the multiple vehicles are able to traverse from a first side of the loop to a second side of the loop via each of multiple different paths.

4. A pallet-conveying system, comprising:
  a vehicle-traversing loop;
  multiple vehicles configured to travel around the vehicle-traversing loop and move pallets around the vehicle-traversing loop;
  an inbound conveying lane arranged to move inbound pallets from a docking area to the vehicle-traversing loop;
  multiple outbound conveying lanes arranged to transfer pallets from the vehicle-traversing loop to the docking area;
  an into-storage conveying lane arranged to move pallets from the vehicle-traversing loop to a storage area;
  a from-storage conveying lane arranged to move pallets from the storage area to the vehicle-traversing loop;
  multiple pallet stands located within an interior of the vehicle-traversing loop to receive pallets from the multiple vehicles; and
  a common rework station that is adapted to receive pallets that do not satisfy criteria for proceeding from the inbound conveying lane to the vehicle-traversing loop, the common rework station being structured to provide human access to and manipulation of pallets received at the common rework station.

5. A pallet-conveying system, comprising:
  a vehicle-traversing loop;
  multiple vehicles configured to travel around the vehicle-traversing loop and move pallets around the vehicle-traversing loop;
  an inbound conveying lane arranged to move inbound pallets from a docking area to the vehicle-traversing loop;
  multiple outbound conveying lanes arranged to transfer pallets from the vehicle-traversing loop to the docking area;
  an into-storage conveying lane arranged to move pallets from the vehicle-traversing loop to a storage area;
  a from-storage conveying lane arranged to move pallets from the storage area to the vehicle-traversing loop;
  multiple pallet stands located within an interior of the vehicle-traversing loop to receive pallets from the multiple vehicles; and
  a pallet elevator located within the interior of the vehicle-traversing loop to receive pallets from the multiple vehicles on a first level of a building that includes the pallet-conveying system and provide received pallets to a second level of the building, and to receive pallets from the second level of the building and provide received pallets to the first level of the building.

6. The system of claim 5, further comprising an inbound-elevator conveying lane to transfer pallets from the vehicle-traversing loop to the pallet elevator; and an outbound-elevator conveying lane to transfer pallets from the pallet elevator to the vehicle-traversing loop.

7. A computer-implemented method, comprising:
  determining, by a computing system, that a first pallet has been conveyed by a first conveying system to a pick-up location at a vehicle-traversing loop, around which multiple vehicles are configured to travel and move pallets, the first pallet having a destination of a second conveying system that is arranged to move pallets away from the vehicle-traversing loop;

identifying, by the computing system, that the second conveying system is designated to receive a second pallet from the vehicle-traversing loop before the first pallet;

determining, by the computing system, whether the second pallet has been received by the second conveying system;

responsive to determining that the second pallet has not been received by the second conveying system, determining, by the computing system, whether the first pallet is blocking the second pallet from being conveyed by the first conveying system to the vehicle-traversing loop; and responsive to determining that the first pallet is blocking the second pallet from being conveyed by the first conveying system to the vehicle-traversing loop:
  releasing, by the computing system, the first pallet from the pick-up location to the vehicle-traversing loop; and
  designating, by the computing system, the destination of the first pallet as a storage location that is different from the second conveying system and that is served by the vehicle-traversing loop.

8. The computer-implemented method of claim 7, wherein the second conveying system comprises an outbound conveying lane arranged to move pallets from the vehicle-traversing loop to a docking area.

9. The computer-implemented method of claim 7, wherein:
  the vehicle-traversing loop comprises a rail; and
  the multiple vehicles comprise rail-guided vehicles.

10. The computer-implemented method of claim 7, wherein the storage location comprises a pallet stand configured to receive and store a single pallet at a time from the vehicle-traversing loop.

11. The computer-implemented method of claim 10, wherein the pallet stand is located within an interior of the vehicle-traversing loop.

12. The computer-implemented method of claim 11, wherein:
  multiple pallet stands are located within the interior of the vehicle-traversing loop; and
  the method comprises selecting, by the computing system, the pallet stand from among the multiple pallet stands to designate as the storage location for the first pallet, as a result of the pallet stand being a nearest-available pallet stand, of the multiple pallet stands, that is located upstream of the second conveying system.

13. The computer-implemented method of claim 7, further comprising:
  determining, by the computing system, that the second pallet has been moved by the vehicle-traversing loop to the second conveying system; and
  releasing, by the computing system, the first pallet to the vehicle-traversing loop, responsive to determining that the second pallet has been moved to the second conveying system.

14. The computer-implemented method of claim 7, wherein the computing system is configured to release the first pallet from the pick-up location to the vehicle-traversing loop with the destination being the second conveying system, had the computing system determined that the second pallet had been received by the second conveying system.

15. The computer-implemented method of claim 7, wherein the computing system is configured to hold the first pallet at the pick-up location, had the computing system determined that the first pallet was not blocking the second pallet from being conveyed by the first conveying system to the vehicle-traversing loop.

16. The computer-implemented method of claim 15, wherein the computing system is configured to designate the second pallet has having priority status while the first pallet is being held at the pick-up location, had the computing system determined that the first pallet was not blocking the second pallet from being conveyed by the first conveying system to the vehicle-traversing loop.

17. A computing system, comprising:
  one or more processors; and
  one or more computer-readable devices including instructions that, when executed by the one or more processors, cause the computing system to perform operations that include:
    determining that a first pallet has been conveyed by a first conveying system to a pick-up location at a vehicle-traversing loop, around which multiple vehicles are configured to travel and move pallets, the first pallet having a destination of a second conveying system that is arranged to move pallets away from the vehicle-traversing loop;
    identifying that the second conveying system is designated to receive a second pallet from the vehicle-traversing loop before the first pallet;
    determining whether the second pallet has been received by the second conveying system;
    responsive to determining that the second pallet has not been received by the second conveying system, determining whether the first pallet is blocking the second pallet from being conveyed by the first conveying system to the vehicle-traversing loop; and
    responsive to determining that the first pallet is blocking the second pallet from being conveyed by the first conveying system to the vehicle-traversing loop:
      releasing the first pallet from the pick-up location to the vehicle-traversing loop; and
      designating the destination of the first pallet as a storage location that is different from the second conveying system and that is served by the vehicle-traversing loop.

18. The computing system of claim 17, wherein the computing system is configured to release the first pallet from the pick-up location to the vehicle-traversing loop with the destination being the second conveying system, had the computing system determined that the second pallet had been received by the second conveying system.

19. The computing system of claim 17, wherein the computing system is configured to hold the first pallet at the pick-up location, had the computing system determined that the first pallet was not blocking the second pallet from being conveyed by the first conveying system to the vehicle-traversing loop.

* * * * *